United States Patent [19]

Holmes et al.

[11] 4,403,281
[45] Sep. 6, 1983

[54] APPARATUS FOR DYNAMICALLY CONTROLLING THE TOOL CENTERPOINT OF A ROBOT ARM OFF A PREDETERMINED PATH

[75] Inventors: John G. Holmes; Brian J. Resnick, both of Cincinnati, Ohio

[73] Assignee: Cincinnati Milacron Industries, Inc., Cincinnati, Ohio

[21] Appl. No.: 250,908

[22] Filed: Apr. 3, 1981

[51] Int. Cl.³ .................. G06F 15/46; G05B 19/24
[52] U.S. Cl. ......................... 364/170; 364/167; 364/513; 318/568; 414/730
[58] Field of Search ............ 364/170, 171, 193, 513, 364/162, 167; 318/568; 414/730

[56] References Cited

U.S. PATENT DOCUMENTS

| | | | |
|---|---|---|---|
| Re. 30,016 | 5/1979 | Hohn | 364/513 |
| 3,770,947 | 11/1973 | Deily | 364/170 |
| 3,866,179 | 2/1975 | McGee et al. | 364/170 |
| 3,888,361 | 6/1975 | Becker et al. | 364/513 |
| 4,025,838 | 5/1977 | Watanabe | 318/568 |
| 4,035,706 | 7/1977 | Cutler | 364/170 |
| 4,086,522 | 4/1978 | Engelberger et al. | 318/568 |
| 4,140,953 | 2/1979 | Dunne | 318/568 |
| 4,162,527 | 7/1979 | Kilbane et al. | 364/170 |
| 4,166,543 | 9/1979 | Dahlstrom | 318/601 |
| 4,178,632 | 12/1979 | Anthony | 364/513 |
| 4,347,578 | 8/1982 | Inaba | 364/513 |
| 4,356,554 | 10/1982 | Suswjara et al. | 367/140 |

OTHER PUBLICATIONS

'A Flexible Robot Arc Welding System', J. G. Holmes and B. J. Resnick, pp. 1, 12, 13, Soc. of Manf. Engr. MS 79-790, (1979).
User's Guide to Val TM, A Robot Programming and Control System by Unimation Inc., Ver. 12, Jun. 1980.

Primary Examiner—Mark E. Nusbaum
Assistant Examiner—William G. Niessen
Attorney, Agent, or Firm—John W. Gregg

[57] ABSTRACT

An apparatus is disclosed for modifying the motion of a tool centerpoint associated with the function element of a robot arm. The motion to be modified is produced during an automatic mode of operation in which the tool centerpoint travels along predetermined paths between programmed points at a programmed velocity. The apparatus is effective to modify the motion during the automatic mode in response to sensed deviations from the predetermined path. Two alternative schemes of modifying the motion are disclosed. A first alternative scheme returns the tool centerpoint to the predetermined path before it reaches the programmed point defining the end of the path. A second alternative scheme produces a new end point offset from the programmed end point and effects motion along offset paths which are translated and rotated from the predetermined paths defined by the programmed points. Both schemes are suitable for effecting modification of motion in response to deviations which are commanded manually by an operator or automatically by equipment monitoring the workpiece processing effected by the function element.

23 Claims, 9 Drawing Figures

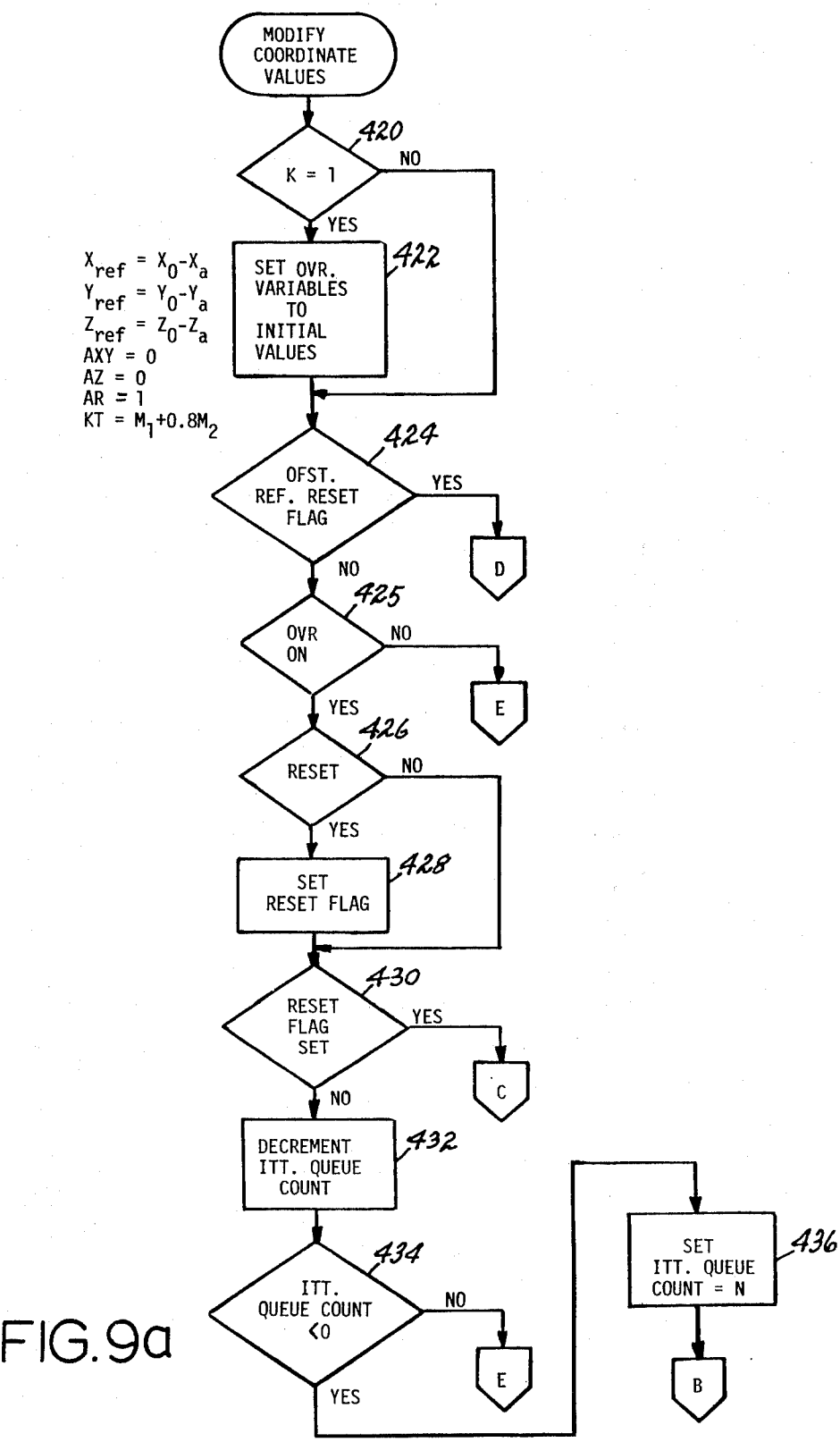

APPARATUS FOR DYNAMICALLY CONTROLLING THE TOOL CENTERPOINT OF A ROBOT ARM OFF A PREDETERMINED PATH

BACKGROUND OF THE INVENTION

Typically with controlled path computer operated robot arms the path of the controlled point associated with the end of the robot arm, i.e. the tool centerpoint, is determined during the teaching or programming mode of operation. In the teaching mode, a number of predetermined points are defined and stored; and during the automatic mode of operation, the robot control generates a predetermined path between the programmed points. Once this programmed path is defined, it is fixed and unchangeable during the automatic mode of operation. However, there are many situations in which the actual process requires that the relationship between the robot arm and the workpiece be different from the relationship that was taught.

For example, in a seam welding application, the actual seam location will be different from one workpiece to the next; and the programmed path will be inadequate to control the tool centerpoint along the seam when using the same program to weld a number of workpieces. Consequently, there is a requirement that the programmed path be modifiable during the automatic mode of operation, i.e., the relationship between the tool centerpoint and the workpiece be dynamically adjusted between the predetermined points. Although there may be many techniques for solving this problem, two variations will be disclosed.

First, the operator may be provided with a control stick having forward, backward, left and right motions which represent respective up, down, left and right deviations from the program path. During the automatic mode of operation, the operator observes the relationship between the tool centerpoint and the seam and moves the control stick to command the necessary deviations from the programmed path to maintain the tool centerpoint in the correct relationship to the seam. The control stick motion energizes contacts which are connected to the robot control. The robot control detects the contact inputs and executes an appropriate path modification.

In another embodiment, a seam following apparatus may be attached to the end of the robot arm which moves along the programmed path. As this apparatus detects deviations of the seam from the programmed path, it energizes contacts which define the direction of the deviation to the robot control. The control then modifies the path to correspond to the detected deviations. There are other applications in which it may be desirable to change the relative position of the tool centerpoint to the workpiece from the programmed relationship. For example, the robot may be required to follow the contour of an edge of a workpiece for deburring or a flashing removal operation. In these situations, the contour of the edge may vary from one workpiece to another.

It is therefore one object of the present invention to provide a means by which an operator may effect changes of motion of a tool centerpoint associated with a function element of a robot arm during an automatic mode of operation.

It is a further object of the present invention to effect changes of motion from a predetermined path between two programmed points during an automatic mode of operation.

It is a further object of the present invention to effect changes of motion from a predetermined path in response to deviation signals produced automatically by workpiece processing related apparatus during an automatic mode of operation.

It is a further object of the present invention to generate offset paths displaced from predetermined paths in response to deviation signals whether manually or automatically produced.

SUMMARY OF THE INVENTION

According to one embodiment of the invention, applicants claim an apparatus for controlling a robot arm and modifying the motion of a tool centerpoint from a predetermined path between two programmed predetermined points. The predetermined points are defined by stored input signals defining two positions and a path velocity therebetween relative to a rectangular coordinate system. The robot arm is comprised of a base and an upper arm having one end in mechanical communication with the base and being movable with respect to the base about two perpendicular axes of rotation. A lower arm has one end associated with the tool centerpoint and the other end pivotally joined to the other end of the upper arm by a third axis of rotation. A plurality of actuators are associated with the axes of rotation, and the axes of rotation and the upper and lower arms define a generalized coordinate system independent of the rectangular coordinate system. Further means are provided for producing a deviation signal in response to detecting desired deviations in the position of the tool centerpoint. The deviation signals command a change in the position of the tool centerpoint off the predetermined path. A robot control having means for storing the input signals and a servomechanism circuit connected to the actuators for moving the tool centerpoint along the predetermined path between the two predetermined points executes a control process. First, in response to the input signals the control generates a set of intermediate signals representing intermediate coordinate values relative to the rectangular coordinate system of an intermediate point along the predetermined path. The set of the intermediate signals is modified in response to the deviation signal to produce a modified set of intermediate signals representing an offset point displaced from the predetermined path. Next, the control generates in response to the modified intermediate signals, a set of individual control signals representing generalized coordinate values relative to the generalized coordinate system of the offset point. The individual control signals are applied to the servomechanism circuit to operate the actuators in a coordinated manner to move the tool centerpoint to the offset point. The control process iterates to cause the tool centerpoint to move through a series of offset points displaced from the predetermined path.

BRIEF DESCRIPTION OF THE DRAWINGS

FIGS. 9a, 9b, 9c, 9d and 9e are a detailed flow chart of a routine for executing the second alternative solution.

DESCRIPTION OF THE PREFERRED EMBODIMENT

Figure 1:
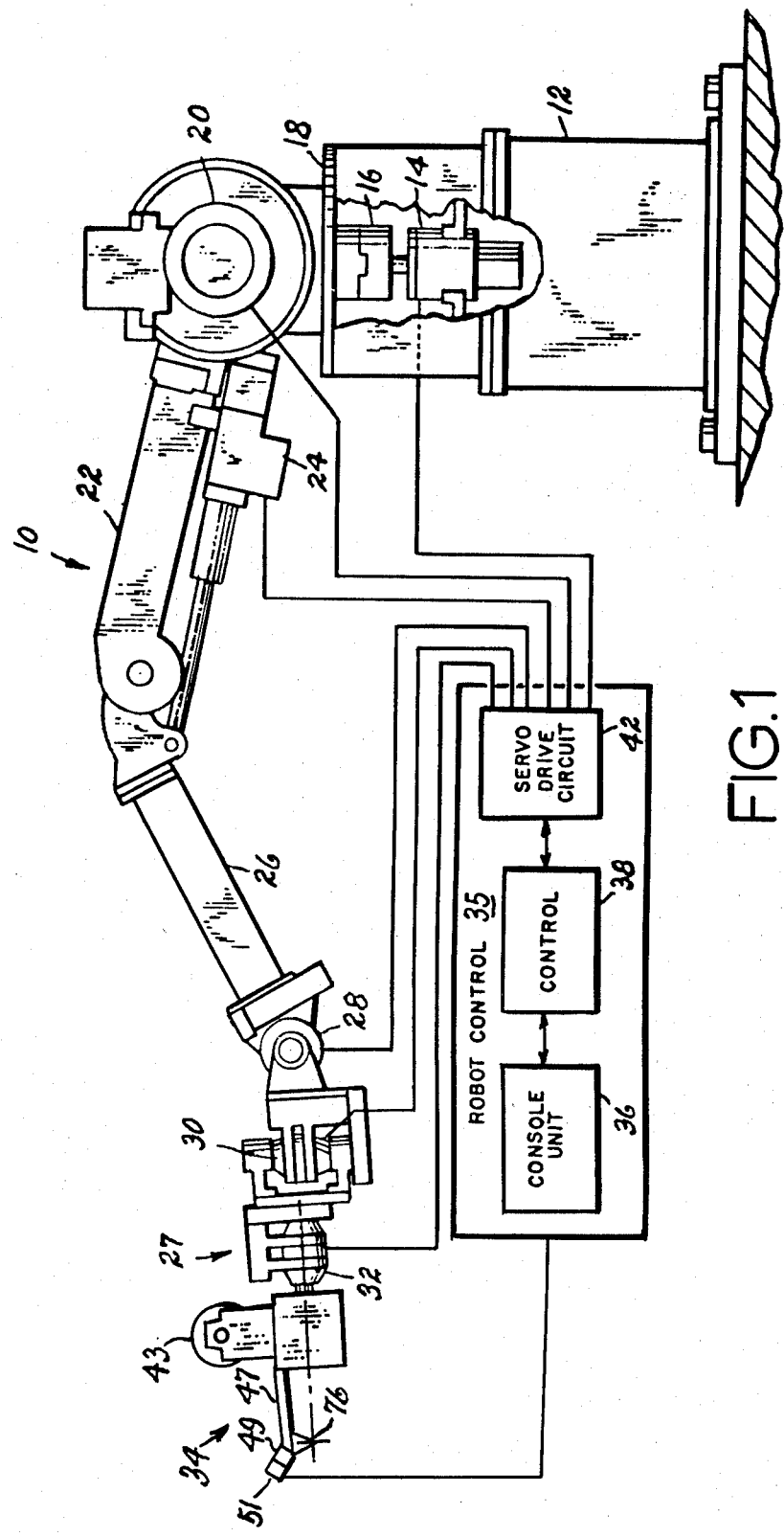
FIG. 1 is an overall view of the robot arm and illustrates its general relationship to a robot control system.

FIG. 1 is a general configuration of a commercially available robot arm, and FIG. 1 further includes a general block diagram of a robot control with a robot arm. As used herein, the term robot arm encompasses any machine which may be subject to the claimed invention. The illustrated robot arm 10 is comprised exclusively of axes or rotary motion. A base 12 contains an actuator 14 which is connected by means of a coupling 16 to a rotatably mounted plate 18. Rigidly fixed to the plate 18 is an actuator 20 providing a second axis of rotation. An upper arm 22 is attached to a working member of the actuator 20. Affixed to the upper arm 22 is an actuator 24 which provides a rotation of the lower arm element 26 about the upper arm element 22. Actuators 14, 20 and 24 are sufficient to move the tool centerpoint to any point in space within its range. A wrist 27 is comprised of rotary actuators 28, 30 and 32 and is connected to a function element 34. It should be noted that the exact nature of the actuators is not significant to this disclosure. Prior art methods of actuator control whether the actuator is electric, hydraulic, pneumatic, etc. are applicable.

The predetermined path is defined by the robot arm moving the tool centerpoint of the function element through space in response to a program. The exact location of the tool centerpoint will be a function of the tooling which defines the function element. For example, the tool centerpoint may be the point at which gripping tongs come together, e.g., point 76, a point at the end of a cutting tool, the point at which spot welding heads come together, a point in the center of the spray fan from a spray gun, the focal point of an optical tracing head, etc. It should be noted that the function element 34 has a small actuator (not shown) for generating the desired function, e.g., a gripping action.

For purposes of illustration, FIG. 1 shows as the function element 34, the combination of an arc welding nozzle 47 with an arc welding wire feed mechanism 43 and a seam following sensor 49 together with sensor sending unit 51. As will be explained more completely subsequently, information derived from the sensor 49 and transmitted via the sending unit 51 to robot control 35 is used or may be used to adapt the motion of the tool centerpoint to variations from the expected path.

Within a robot control 35, a console unit 36 is provided as a communication link to the robot arm. The console includes general control functions and input devices for generating input signals to enable a predetermined cycle of operation. The console unit includes controls for programming or teaching the robot arm a cycle of operation. A control 38 utilizes programs and input signals to generate a predetermined path therefrom and produces control signals to a servomechanism drive circuit 42. The drive circuit 42 commands the actuators on the robot arm to move the tool centerpoint on the function element along the predetermined path.

A robot arm and control as described herein corresponds to the $T^3$ industrial robot and control commercially available from Cincinnati Milacron Inc. Further, the detailed operation of the robot arm in its automatic mode of control is described in U.S. Pat. No. 3,909,600, and a description of the method and apparatus utilized for teaching the robot arm a program is described in U.S. Pat. No. 3,920,972.

Figure 2:
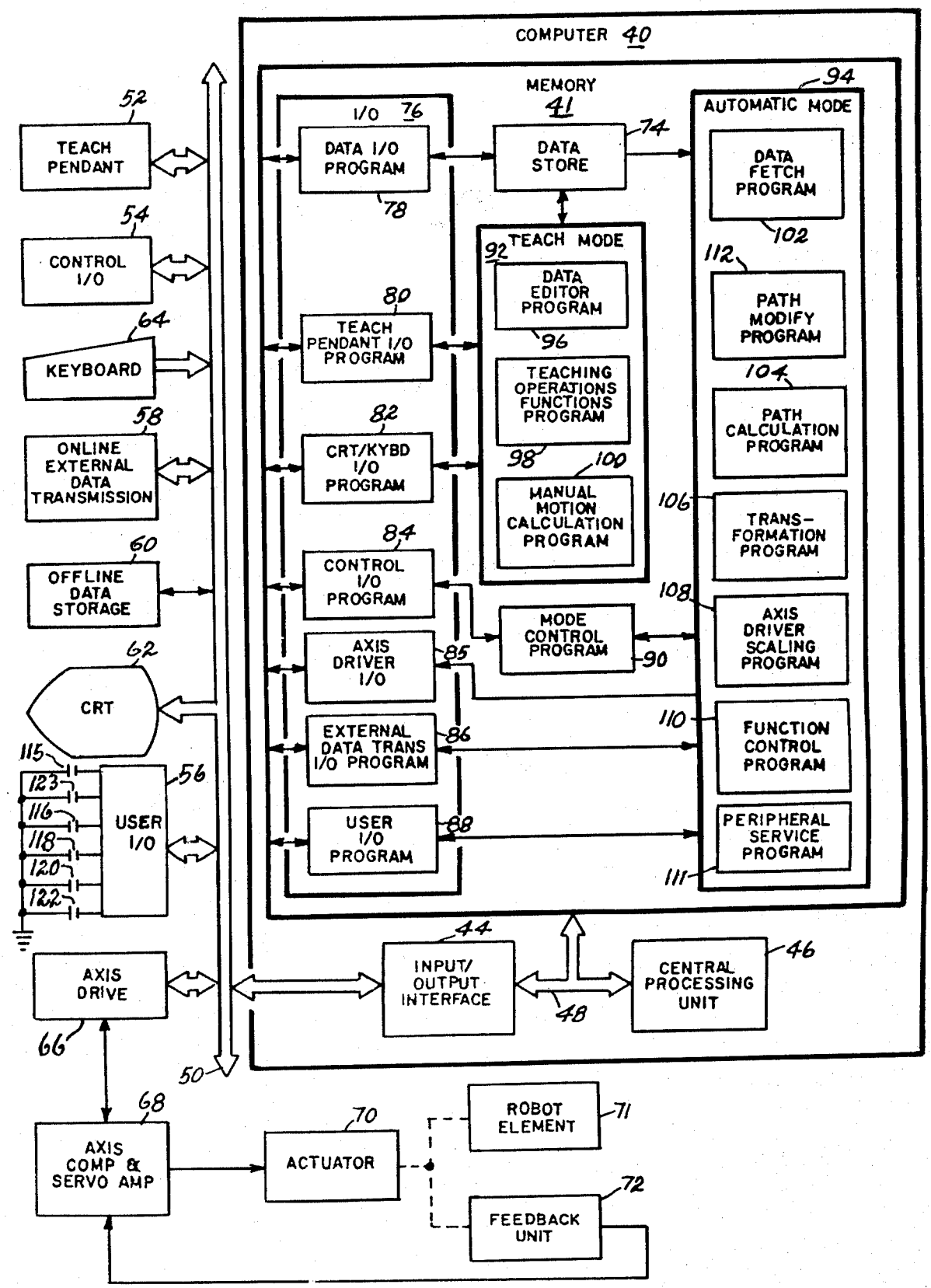
FIG. 2 is a detailed block diagram of a robot control system for controlling the operation of the robot arm and illustrates the general environment for utilizing the invention.

FIG. 2 is a detailed block diagram illustrating the basic components of the commercially available robot control referenced above. A programmed computer 40 is comprised of a memory circuit 41, input and output interface circuit 44 and a central processing circuit 46. These three main elements are interconnected by an internal bus 48. Control signals are passed to and from the computer 40 by means of an external bus 50 which is connected to a number of peripheral devices. First, a teach pendant 52 is a remote programming tool utilized by the operator to move the end of the robot arm to a number of desired positions during the teaching process. Next, control I/O 54 defines a number of miscellaneous machine tool signals which are necessary for the operation of the robot arm. The online external data transmission block 58 represents a device which allows data to be entered into the computer 40 from an external data stored on a real time basis, i.e. while the robot arm is executing a cycle of operation. An offline data storage unit 60 is provided for allowing programs to be input to the computer by means of such devices as a punched tape reader, a cassette reader, etc. The CRT 62 and keyboard 64 provide means by which the robot arm and its control are able to communicate messages to and from the operator.

The axis drive unit 66 accepts blocks of data from the computer on a periodic basis. Each block of data represents the incremental magnitudes of motion of the robot arm actuators during each periodic interval. Further, the magnitude of motion over each fixed period inherently provides a definition of the desired velocity of the robot arm. The axis drive 66 accepts the data in digital form and executes a digital-to-analog conversion thereby providing an analog signal to the axis compensation and servoamplifier 68. The compensated analog signals are then used as an input to an actuator 70 which drives the robot element 71 mechanically attached thereto. A feedback device 72 is mechanically connected to the actuator and provides a feedback signal representing the actual motion of the driven element of the robot arm. It should be noted that although there are several configurations for control of the servomechanism loop for each element of the robot arm, in the preferred embodiment, the axis drive 66, servoamp 68, actuator 70 and feedback element 72 are utilized in numbers equal to the number of controlled axes on the robot arm.

The memory 41 within the computer 40 is comprised of two basic components. The first being the data store 74 which stores all numerical data information, and the remainder of the memory is defined as the operating system of the robot arm. The operating system may be characterized as a control program which defines how data is to be generated and utilized during the operation of the robot arm.

The first section of the operating system is an I/O section 76. The I/O programs include a data I/O program 78, teach pendant I/O program 80, a CRT and keyboard I/O program 82, a control I/O program 84, an axis driver I/O program 85, an external data transmission program 86, and the user I/O program 88. It will be noted that there is an I/O program corresponding to each different type of peripheral being interfaced into the control system. Each I/O program is uniquely responsive to the data produced by each peripheral device and is effective to control the flow of signals from the peripheral devices into and out of the computer.

The operating system also contains a mode control program 90 which exercises overall control over the operating system. The mode control program 90 switches control of the computer between the various operating modes, e.g., manual, teach, automatic, etc. However, since only the automatic mode is required for the disclosed invention, only this mode will be discussed in detail. Within the teach mode system 92 is a data editor program 96 and a teaching operation function program 98. These two programs control the operation of the robot arm during the teach mode, and the specifics of these programs are either described in U.S. Pat. No. 3,920,972 or are available from Cincinnati Milacron Inc. The automatic mode system 94 is comprised of a data fetch program 102, a path calculation program 104, a transformation program 106, an axis driver program 108, a function control program 110 and a peripheral service program 111. The details of these programs are either specifically described in U.S. Pat. No. 3,909,600 or are available from Cincinnati Milacron Inc.

The automatic mode system 94 also contains a path modification program 112 which is the subject matter of the presently claimed invention. As described earlier, either by an apparatus attached to the end of the robot arm or by a remote device under operator control, deviation signals are generated to command a desired deviation from a predetermined path. The contacts 116 through 122 represent deviations which are up, down, left or right, respectively, from the programmed path. The contacts 115 and 123 represent reset commands which cause the tool centerpoint to return to the predetermined path. These contacts are representative of outputs from an apparatus for commanding a change to the predetermined path. Closures of these contacts produce deviation signals which are inputs to the user I/O 56.

Figure 3:
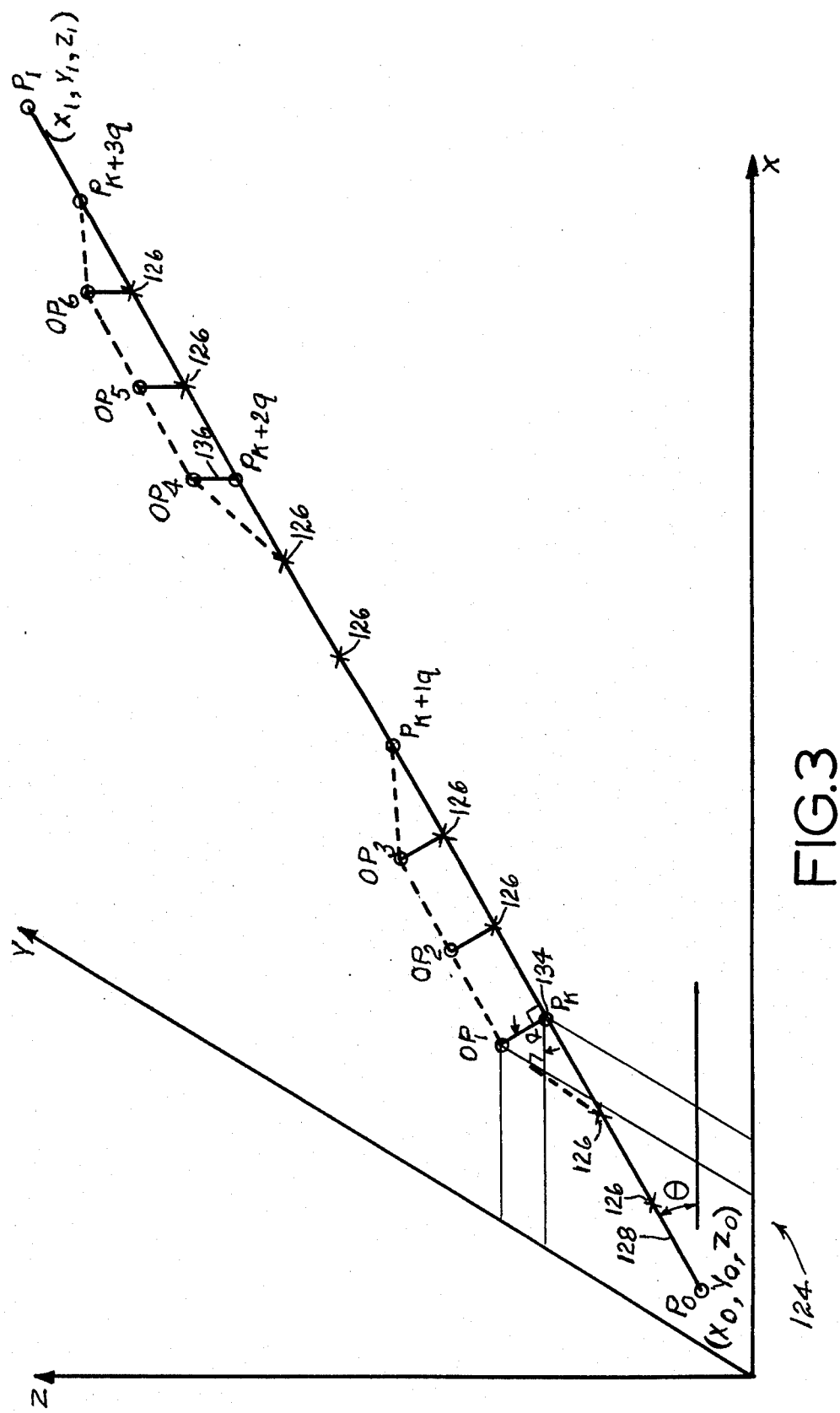
FIG. 3 illustrates the relationship of offset points to the predetermined path between two programmed predetermined points.

FIG. 3 is an illustration of the relationship of the offset points to the predetermined path and the programmed points. The axes X, Y, and Z define a rectangular coordinate system 124 in which the X-Y plane is horizontal and Z is vertical. $P_o$ and $P_1$ are programmed points lying in the X-Y plane which are defined during the teaching process. Input signals representing rectangular coordinate values relative to a rectangular coordinate system 124 of the programmed points $P_o$ and $P_1$ are stored for use by the robot control. During the automatic mode of operation, the robot control creates a set of intermediate signals representing rectangular coordinate values of intermediate points, $P_k$ typically shown at 126, which are defined by the iteration rate of drive circuit control signals and the programmed velocity. The intermediate points have coordinates of general form $(X_k, Y_k, Z_k)$. As will be explained in greater detail subsequently, applicants preferred embodiment does not permit alteration of the offset displacement from all intermediate points, rather, increments of displacement can be effected at intermediate points that occur at integral intervals from a first modifiable intermediate point. The intermediate points lying within these intervals are modified by the net accumulated displacement. The modifiable intermediate points are designated in FIG. 3 and $P_{k+cq}$ and the offset points resulting from modification of those point coordinates are designated as $OP_p$. by causing the tool centerpoint to move to each of the intermediate points, the control 35 effects motion through a predetermined path from $P_o$ to $P_1$ which is illustrated as a straight line 128 lying in the X-Y plane at an angle $\theta$ with the X axis. The path followed through the offset points is shown as the dashed line.

As the tool centerpoint moves along the path 128 and it is desired to move the tool centerpoint in the X-Y plane along a normal to the left of the path, contact 120 will close thereby producing a deviation signal. The robot control will generate a horizontal incremental displacement signal corresponding to 131, which is used to produce coordinate component signals representing coordinate components 130 and 132 of the incremental displacement parallel to the X and Y axes, respectively. The coordinate components are used to modify the coordinate values of point 134, designated $P_k$, thereby producing a modified set of intermediate signals which cause the tool centerpoint to move to the offset point $OP_1$. Further displacements to the left or right are similarly effected by adding or subtracting incremental displacements 131 along the normals from modifiable intermediate points. Using the offset calculated to move the tool centerpoint to $OP_1$, the path indicated by the dashed line of FIG. 3 shall be effective for the immediately following intermediate points 126 for which the control does not permit further modification by incremental displacements 131. Should it be desired to move the tool to the right of the offset points the right contact 122 will close or the operator may close the reset contact 115. In either event, the next incremental offset shall be effective to modify the coordinate data associated with the intermediate point $P_{k+1q}$. Since if no further displacements were desired, the coordinates of point $P_{k+1q}$ would be modified by the previous offset increments effective to modify intermediate points beginning with $P_k$, requesting either a reset of the offset or an offset to the right shall result in the coordinates of the intermediate point being restored to the original coordinates for the point along path 128. Similarly, if it were desired to offset the tool centerpoint vertically, contacts 116 or 118 will close. Assuming contact 116 closes, then the next modifiable intermediate point, $P_{k+2q}$ shall be modified by vertical offset increment 136 causing the tool centerpoint to again move along the dashed line path to offset point $OP_4$. The next modifiable intermediate point is $P_{k+3q}$. If a return to the programmed path were desired, it could be effected by closing down contact 118 or the reset contact 115. In either event, the tool centerpoint would follow the path indicated by the dashed line from $OP_6$ to $P_{k+3q}$.

Figure 4:
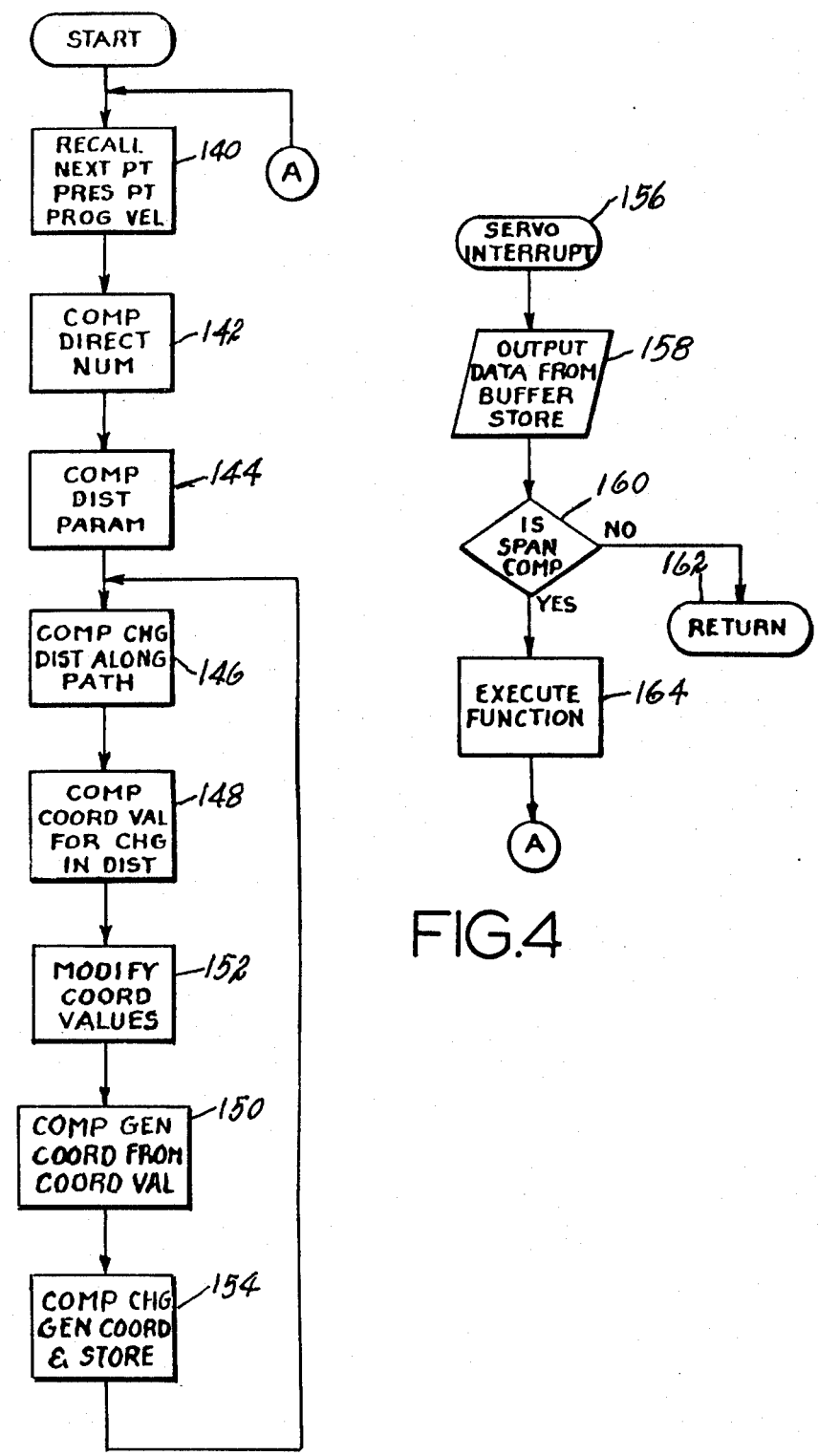
FIG. 4 is a flow chart illustrating the general method of controlling the robot arm.

FIG. 4 illustrates a flow chart defining the process steps required to execute the automatic mode of operation. Process block 140 recalls the rectangular coordinate values of two programmed points and the predetermined path velocity from storage. Process step 142 computes the direction numbers. Each direction number has a sense representing the direction of motion and a magnitude proportional to a rectangular coordinate component of the path between the programmed points. Process step 144 computes the distance parameters along the path between the programmed points. Process step 146 computes the change in distance along the path during each iteration of the drive circuit control signals. Next, a set of intermediate signals representing the rectangular coordinate values defining an intermediate point for each change in distance is generated by process step 148. This is accomplished by using the direction numers. Therefore, the computation of the coordinate values of an intermediate point along the path during each iteration requires the operations executed by process steps 142, 144, 146 and 148. Process step 152 modifies the coordinate values for the intermediate point by predetermined increments in accordance with the contact closures that may exist because of desired deviations from the predetermined path. Next, operation step 150 generates the individual control signals representing generalized coordinate values corresponding to modified coordinate values calculated in process step 152. The details of process step 150 may be found in U.S. Pat. No. 3,909,600, which, to the extent necessary to disclose those details, is hereby incorporated by reference herein. Therefore, the details of step 150 will not be discussed here. Finally, process step 154 computes the changes in the generalized coordinate values from the present point to the intermediate point and stores this set of differential generalized coordinate values in a buffer store awaiting an interrupt from the servomechanism drive circuit 42. A number of sets of differential generalized coordinate values may be queued in the buffer store at one time.

As is readily apparent to those who are skilled in the art, the process thus described operates asynchronously with the servomechanism drive circuit 42. The circuit 42 operates on a fixed time base sampling system; in other words, at fixed predetermined intervals of time, the servomechanism requests new information from the computer. By operating the servomechanism at a fixed sampling rate, the computer is provided with several advantages. For example, by knowing the length of the programmed path, the predetermined path velocity and the fixed length of a sample time, the computer is able in process step 144 to compute the number of iterations required to execute the programmed path. Consequently, with this information the computer can then calculate the change in distance along the programmed path during each iteration. Further, as will be appreciated by those who are skilled in the art, the use of a fixed sampling time rate permits the computer to execute many other functions in addition to generating the predetermined path. Because the computer is substantially faster than the peripheral devices attached to it, a backlog of information to be output therefrom is generated. Consequently, a system of interrupts each having a particular priority is used.

The purpose of the servointerrupt routine defined in block 156 is to transfer data from the buffer store in response to an interrupt from the servomechanism drive circuit 42. The interrupt may occur at any time during processing. When the interrupt does occur, control of the process is transferred from the main program to the servointerrupt routine 156. Within the servointerrupt routine 156, process block 158 transfers one of the queued sets of differential generalized coordinate values from the buffer store to the servomechanism drive circuit 42. Next, decision step 160 tests if the path between the two programmed points is complete. If the path is not complete, the servointerrupt routine returns control of the process back to the main program at the point where the interrupt occurred; and the process is continued. If the span is complete, the process step 164 executes a predetermined function after which the process returns to process step 140 to begin the next programmed path.

The time the generalized coordinate signals are stored in the buffer may be for a period of several iterations of intermediate point generation. Consequently, if a change in generalized coordinates is stored for four iterations, it will take that period of time before the tool centerpoint actually responds to the rectangular coordinate values generated for an intermediate point. This time delay in the buffer store is detrimental to the operation of the apparatus used to detect a desired deviation. For example, if this apparatus detects a desired deviation and commands the intermediate point be moved off the predetermined path, the command will be recognized; and a new modified intermediate point determined. However, during the period the change in generalized coordinate values representing this intermediate point are stored in the buffer store, the detecting means continues to detect the fact that the tool centerpoint must be displaced from the predetermined path; and it continues to provide commands to create a modified intermediate point. After the buffer storage time is expired, the tool centerpoint actually begins its displacement from the predetermined path. This process continues until the tool centerpoint is at the desired displaced location. At that point in time, the detecting means ceases to produce commands to modify the position of the intermediate point. If the process of intermediate point modification accumulated increments of displacement for each intermediate point calculation as long as the detecting means detected a desired deviation, then the modified intermediate points would reflect a growing displacement. When this displacement is actually executed the detecting means could detect a desired opposite deviation. Consequently, the effect will be that the tool centerpoint will continuously oscillate or hunt about the actual desired position as determined by the detecting means.

In order to solve the problem discussed above, it is required that the process for modifying the accumulated displacements occur only once over the time period that the set of differential generalized coordinate values are stored in the buffer store. In this manner, when the detecting means commands a change in position of the tool centerpoint, a modification will be made and executed by the machine before a further modification is made. This results in the stepwise offset path associated with modifiable intermediate points described with reference to FIG. 3.

FIGS. 5a, 5b, 5c and 5d comprise a detailed flow chart of the process discussed in FIG. 4. Conversion of the flow chart of FIG. 5 into a coded computer program can be readily accomplished by one having ordinary skill in programming with a language compatible with a general purpose control computer. Upon examining FIG. 5a and comparing it to the flow chart of FIG. 4, one will discover that the majority of operations shown can be classed under the process step of computing distance parameters shown in step 146 of FIG. 4. The reason for this is the problem of determining the magnitude of the change-of-velocity spans.

Generally, a path between two predetermined points may be divided into three separate spans. A first span may require an acceleration or deceleration depending on the velocity upon entry into the span and the programmed path velocity. A second span may be comprised of a constant velocity phase, and a third span may occur if a deceleration is required. Therefore, by examining velocities at the end points of the programmed path, the computer is able to determined whether two or three velocity dependent spans are required. Once this determination is made, a further problem exists. If the required velocities as well as the permissible changes in velocity are known, the length of each velocity dependent span may be calculated. However, the situation may exist where the sum of the ideal velocity dependent spans exceeds the length of the path between the programmed end points. These particular cases have to be detected and handled on an individual basis. Consequently, the computation of distance parameters for all possible situations is a major problem. There is a further problem in the process time required to execute the necessary solutions.

Figure 5A:
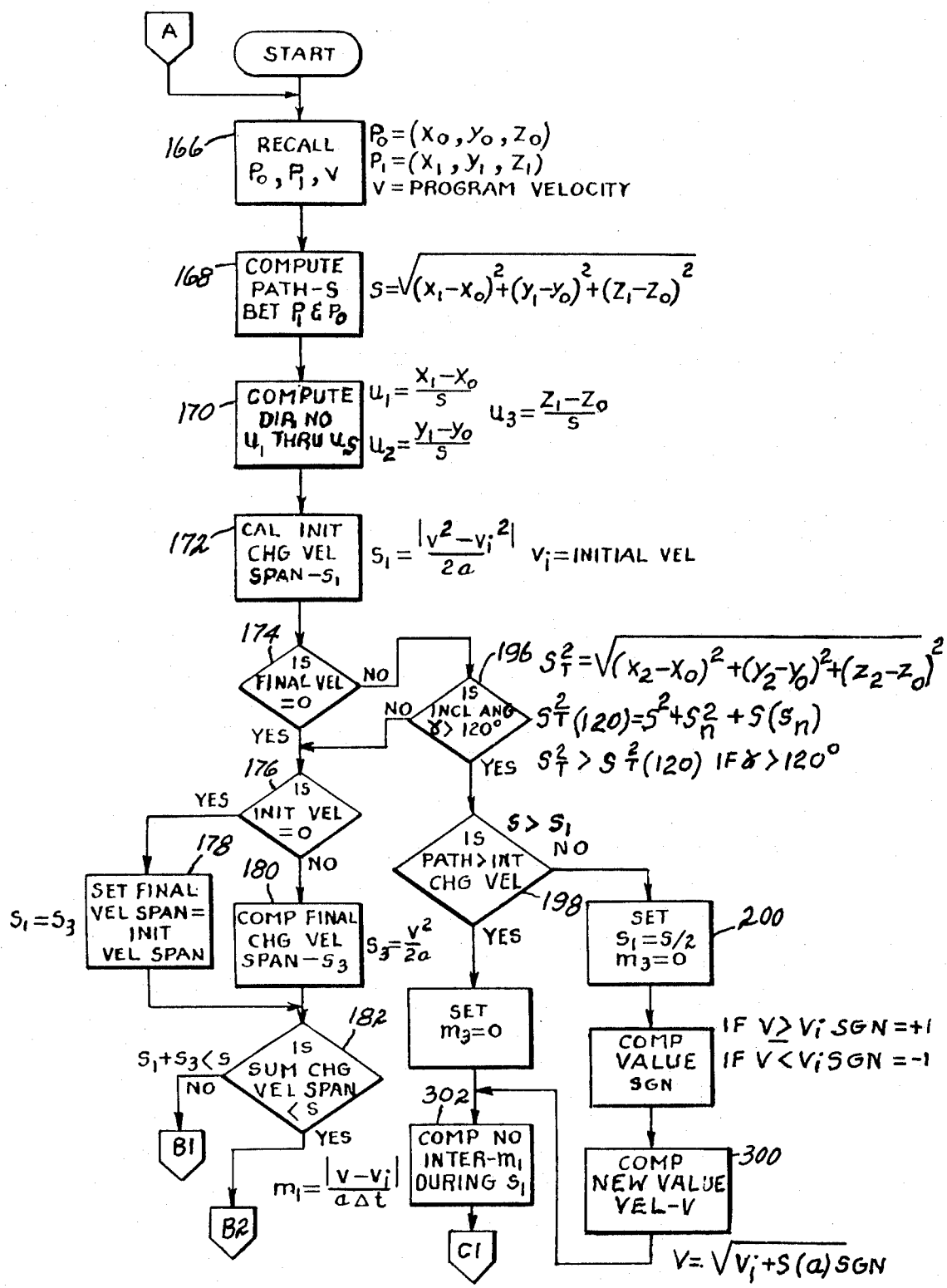
FIGS. 5a, 5b, 5c and 5d illustrate a detailed flow chart of a routine for utilizing the disclosed invention to generate points offset from the predetermined path.
Figure 5B:
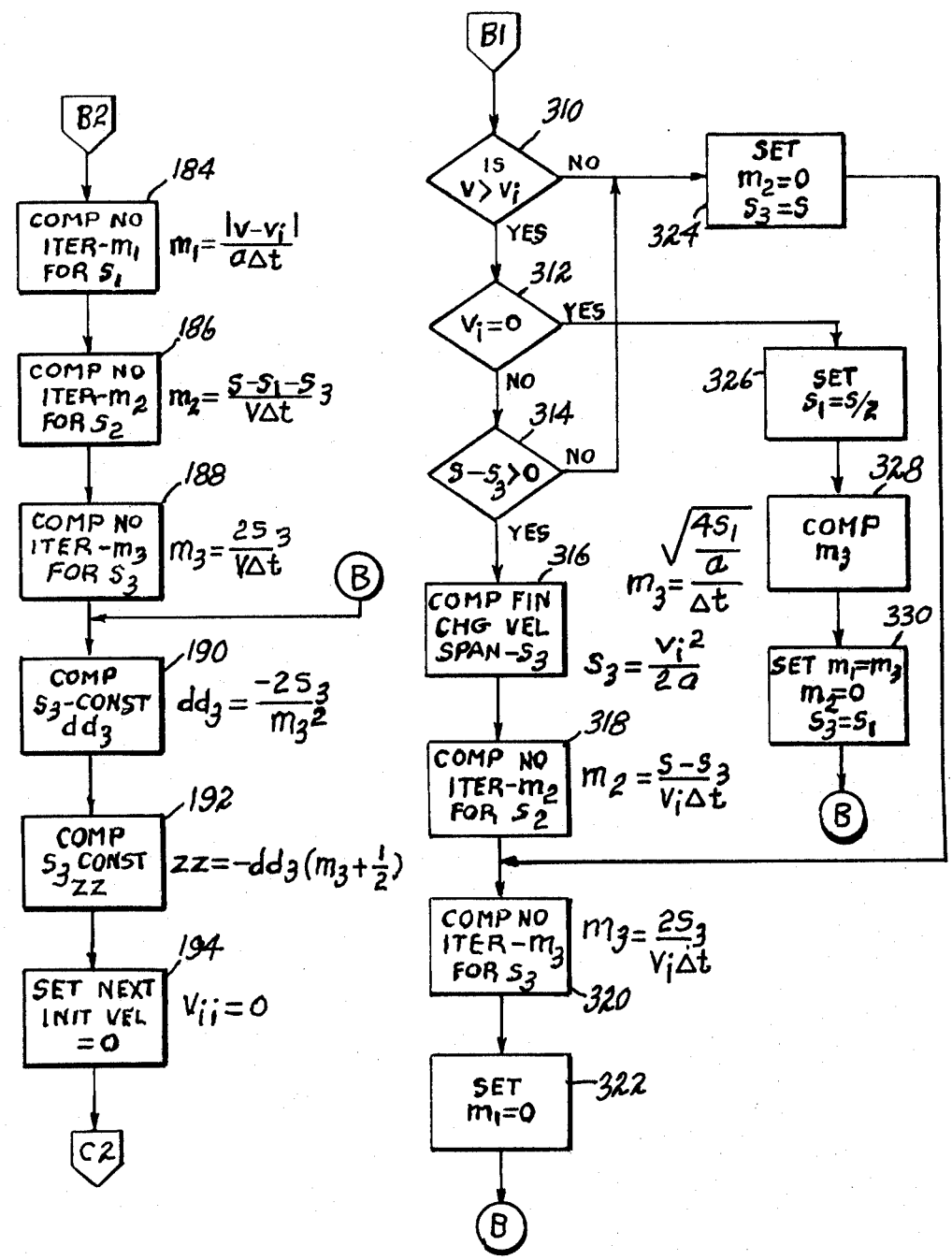
Figure 5C:
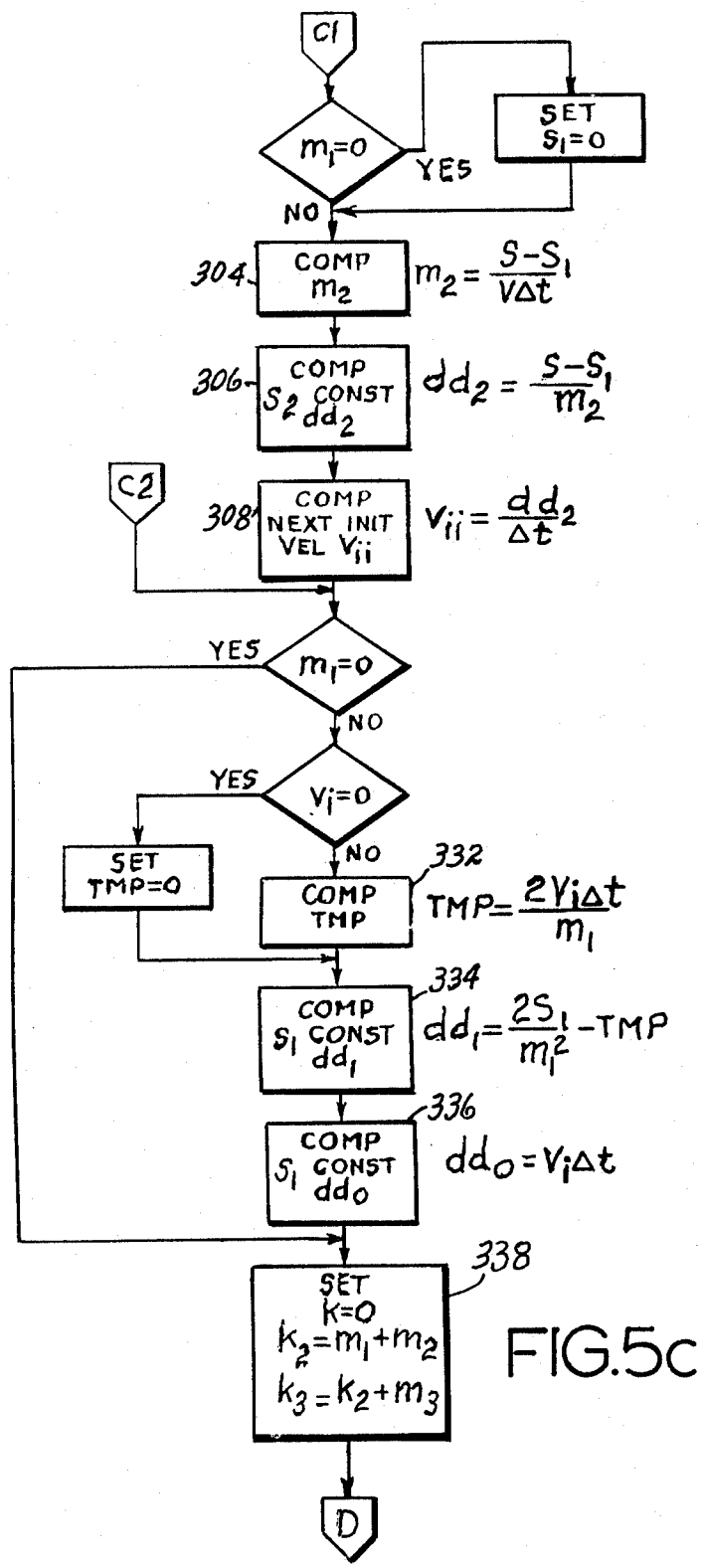

In FIG. 5a, process step 166 recalls the coordinate values $(X_o, Y_o, Z_o)$ defining the position of the present or first programmed point $P_o$ the coordinate values $(X_1, Y_1, Z_1)$ of the next or second programmed point $P_1$ and the programmed path velocity (V) therebetween. Process step 168 calculates the length (S) of the predetermined path. After the direction numbers $(U_1, U_2, U_3)$ are determined by process step 170, process step 172 calculates the length of the initial change-of-velocity span $(S_1)$ using the initial velocity $(V_i)$, the programmed velocity (V) and a predefined rate of acceleration (a). Process block 174 is to determine whether or not the velocity at $P_1$ is zero. In other words, is there a stop between the execution of successive programmed paths or are the successive programmed paths executed in a continuous manner? If the final velocity is zero, the process checks to see if the initial velocity is zero via decision block 176. If the initial velocity and final velocity are both zero, operation block 178 sets the length of the final change in velocity span $(S_3)$ equal to the length of the initial change in velocity span $(S_1)$ calculated in process block 172. If the final velocity is zero, but the initial velocity is not zero, process block 180 is operative to compute the length of the final change in velocity span using the programmed velocity (V) and the acceleration rate (a). At this point, decision block 182 makes a check to determine if the sum of the change in velocity spans computed thus far is less than the length of the programmed path. If the sum of the lengths of the change in velocity spans is less than the length of the programmed path, the process continues with the flow chart of FIG. 5b via the offpage connector B2. It should be noted at this point that the length of the constant velocity span will be equal to the difference between the length of the total path and the length of the sum of the initial and final change in velocity spans. Knowing the lengths of each of the spans comprising the programmed path and the fixed time base of the sampling system, it is now possible to calculate the number of iterations required to execute each of the spans. These calculations are made by process blocks 184, 186 and 188. Next blocks 192 and 194 are operative to calculate constants which are subsequently used in the process.

Returning to the decision block 174 in FIG. 5a, the determination that the final velocity is not zero means that the path moves continuously between successive program spans. Considering the dynamics of the robot itself, this may or may not be physically possible depending on the change in direction or the included angle between successive paths. Applicants have arbitrarily chosen an included angle ($\gamma$) of 120 degrees to be controlling in decision block 196. If the included angle ($\gamma$) between successive paths is greater than 120 degrees, the successive paths are executed on a continuous basis. However, if the included angle ($\gamma$) is less than 120 degrees, the process automatically inserts a stop point; and the successive paths are executed in a discontinuous manner. The Law of Cosines is used to determine if the included angle is greater or less than 120 degrees. This requires using the lengths of the present predetermined path (S) and the length of the next predetermined path $(S_n)$. The square of the distance $(S_T)$ from the first programmed point $P_o$ to the end point $P_2$ of the next predetermined path when the included angle between the two paths is 120 degrees is found from the Law of Cosines to be $$S_{T(120)}^2 = S^2 + S_n^2 + S(S_n)$$

The square of the distance from the first programmed point to the end point $P_2$ may also be computed without regard for the included angle knowing the coordinates $(X_o, Y_o, Z_o)$ of the first programmed point $P_o$ and the coordinates $(X_2, Y_2, Z_2)$ of the end point $P_2$ from the following:

$$S_T^2 = (X_2 - X_o)^2 + (Y_2 - Y_o)^2 + (Z_2 - Z_o)^2$$

Therefore, it may be concluded that the included angle ($\gamma$) is greater than 120 degrees when $$S_T^2 > S_{T(120)}^2$$

Next, decision block 198 determines if the length of the initial change in velocity span is less than the length of the programmed path. If $(S_1)$ is not less than the programmed path, process block 200 arbitrarily sets the length of the initial change in velocity span equal to ½ the length of the programmed path. Further, in process block 300 a new valve for velocity V is computed. It should be noted at this point that if successive program paths are to be executed continuously, by definition, there is no final change of velocity span $(S_3)$. Further, by definition, the number of iterations required to execute the final change in velocity span is equal to zero. If the length of the initial change in velocity span is less than the programmed path, the number of iterations required to execute the initial change in velocity span is computed in operation block 302. The offpage connector C1 is continued in FIG. 5c. In process blocks 304, 306 and 308, constants are computed which are used later in the process, and therefore, will not be discussed at this time.

Returning to FIG. 5a, the significance of the computation of distance parameters should be readily apparent to one who is reasonably skilled in the art. One special case has not been discussed in detail. This case arises with decision block 182 where the sum of the lengths of the initial and final change in velocity spans is not less than the length of the total path. In this case, offpage connector B1 takes us to FIG. 5*b*. Blocks 310 through 330 define another special case which is similar in solution to the other special cases described earlier in detail. Therefore, the process at this point will not be described in detail; and the disclosure contained in blocks 310 through 330 will be deemed sufficient. After execution, this portion of the process continues via onpage connector B to block 190. The process then follows offpage connector C2 to FIG. 5*c*. Again, process blocks 332 through 338 define constants which are used later in the process.

Figure 5D:
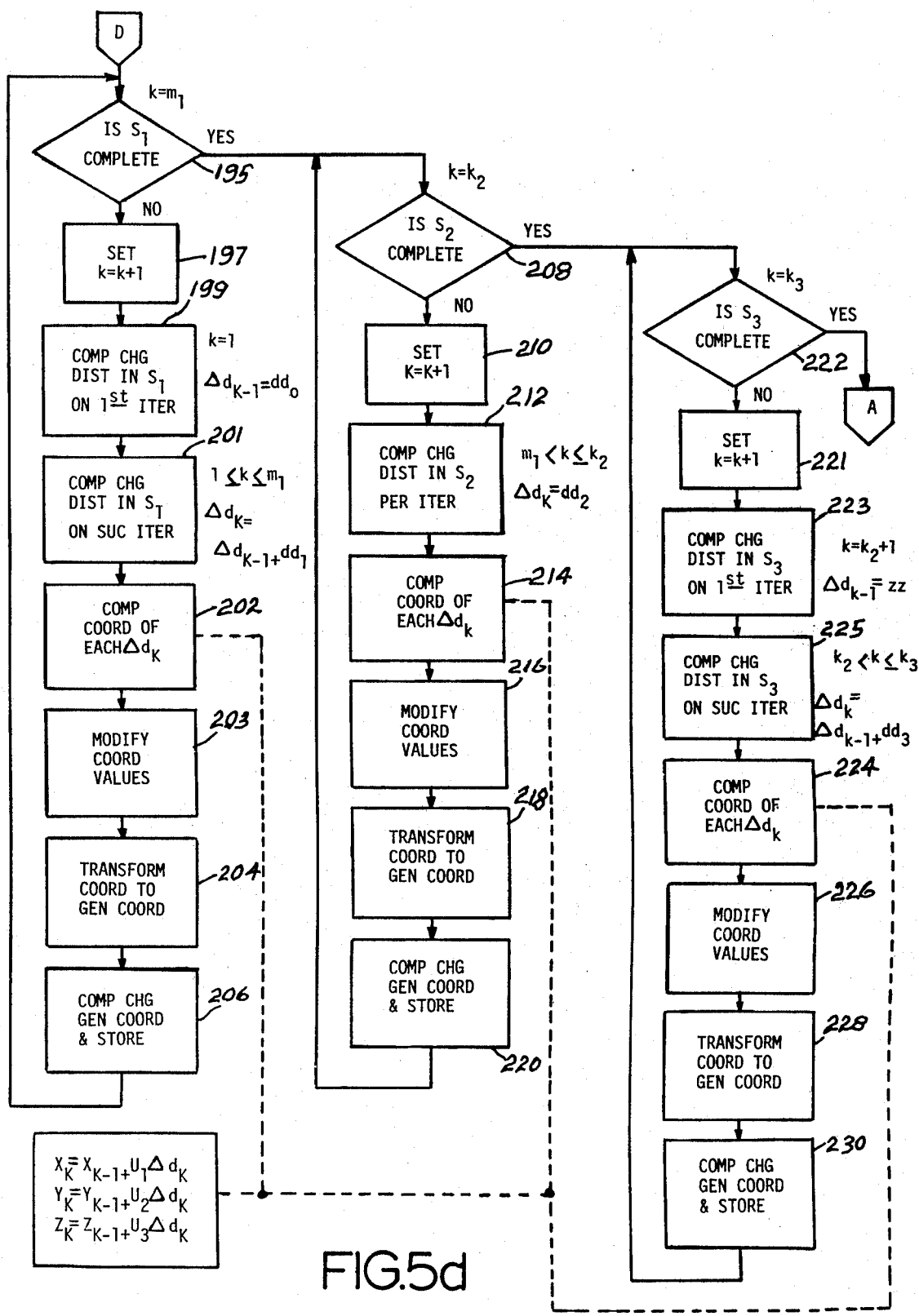

The process continues to FIG. 5*d*. Decision step 195 tests if the initial change-of-velocity span is complete. If it is not, process step 197 initiates the first iteration. Generally, the change in distance along the path for a current iteration is equal to the change in distance along the path during the previous iteration plus some previously calculated constant. The problem arises in calculating the change in distance during the first iteration. This is a special situation which is handled according to the process step 199. The length of the change in distance along the path during the first iteration is equal to a special constant which was calculated earlier. After executing the first iteration, all successive iterations during the first span are determined by process step 201 until the number of iterations (K) is equal to the iteration number ($m_1$) calculated for the initial change-of-velocity span ($S_1$). According to process step 202, the rectangular coordinate values ($X_k, Y_k, Z_k$) defining intermediate points are computed for each change in distance along the path, i.e., for each iteration. Process step 203 executes a process modifying the rectangular coordinate values. Applicants have devised two predetermined path modification schemes which differ in the action to be taken at the end of a predetermined path. FIG. 6 which shall be discussed next, describes a first alternative scheme in which the tool centerpoint is returned to the predetermined path prior to reaching the next programmed point $P_1$. FIG. 9, which shall be discussed in detail subsequently, describes a second alternative scheme in which the tool centerpoint is driven to a modified next point $P_{1d}$ off the predetermined path. Once the intermediate point coordinates have been modified by either of these alternative schemes, execution of the process continues with block 204 of FIG. 5*d*.

Process step 204 transforms these rectangular coordinate values into corresponding generalized coordinate values which are represented by individual control signals defining the absolute position of the intermediate point relative to the generalized coordinate system. Process step 206, calculates the changes in the generalized coordinate values required to move the tool centerpoint from its current position to the intermediate point, and this set of changes in generalized coordinate values is queued in the buffer store to await an interrupt from the servomechanism drive circuit 42. The servointerrupt routine was discussed in reference to FIG. 4, and further discussion at this time is not necessary.

When the number of iterations (K) is equal to the number of iterations, $m_1$, computed for the initial change-of-velocity span, ($S_1$), the process moves to decision block 208 which determines whether the constant velocity span is complete. If the constant velocity span is not complete, the process executes the steps 210, 212, and 214 to compute the rectangular coordinate values of the next intermediate point. Thereafter, process step 216 may modify these coordinate values to move the tool centerpoint off the predetermined path.

Following coordinate modification the intermediate point coordinates as modified are transformed by step 218 to the generalized coordinate form. Then step 220 computes the changes in generalized coordinates and stores these increments in the buffer.

When the number of iterations (K) is equal to the value $K_2$ representing the total number of iterations of the first two spans, the process continues to decision step 222. This step is the first step of the branch of this flow chart dealing with execution of the deceleration subspan ($S_3$). As was the case for the two preceding spans, steps 221 through 230 compute rectangular coordinates of intermediate points along the predetermined path, modify these coordinates as required, transform them to generalized coordinte form and compute and store increments of generalized coordinates.

Figure 6A:
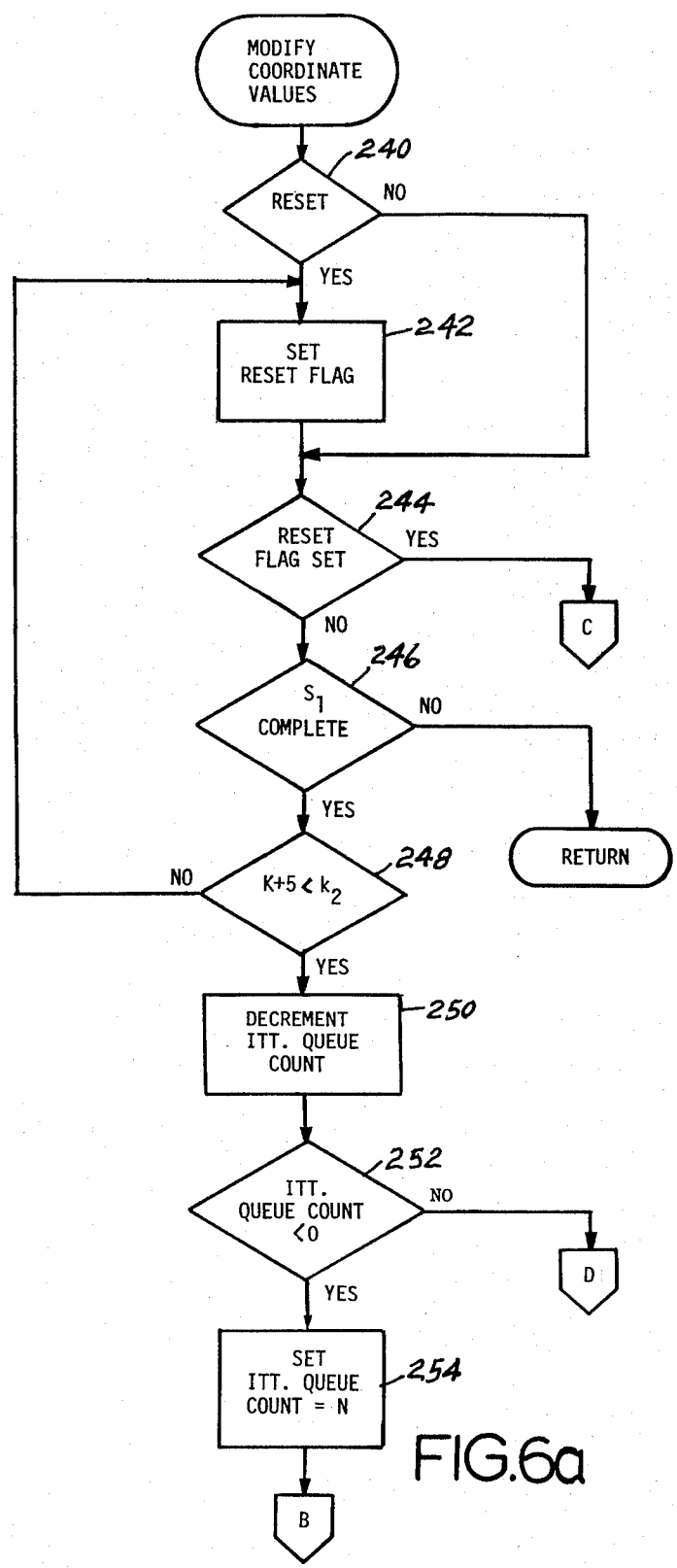
FIGS. 6a, 6b, 6c and 6d are a detailed flow chart of a routine illustrating the specific process steps for determining offset points according to a first alternative solution.

A first modification process is disclosed in detail in FIGS. 6*a* through 6*d*. Referring to FIG. 6*a*, decision step 240 determines whether a reset function has been requested. The reset function may be initiated by the operator or by another step in the process and is effective to move the tool centerpoint back to the predetermined path. If the reset function is not active, process step 244 tests whether the reset flag is set. If the reset flag is not set, process step 246 tests if the initial change-of-velocity span is complete. If this span is not complete, the process immediately returns to step 204 of FIG. 5*d*. Thus, a modification of the predetermined path is not permitted during the initial change-of-velocity span. As a practical matter, the length of this span is relatively short, e.g. approximately 0.1 inches; and therefore, any changes in this span would be relatively ineffective. Consequently, process step 203 has no effect on the rectangular coordinate values of the intermediate point determined by process step 202. Because this first modification process requires that the tool centerpoint always be returned to the predetermined path prior to reaching the second programmed point, it will be understood that motion along any predetermined path is initiated at the first programmed point. Therefore, it would not be necessary to call for a reset at the beginning of the predetermined path. However, had a reset been requested, the process, as will be more fully explained subsequently, would result in modification values of zero for the first iteration of the acceleration span ($S_1$) and would effectively cause the tool centerpoint to follow an unmodified path until a non-zero path modification is effected. Therefore, even if during the execution of step 244 it had been determined that the reset flag were set, nevertheless this first alternative process would not result in modification of the intermediate points during the first subspan ($S_1$).

Process steps 248 through 254 determine the relationship of the current iteration to the total number of iterations in the constant velocity span. When the present iteration is within five iterations of the end of the constant velocity span, decision step 249 forces the return of the total centerpoint to the programmed path by carrying the process back to step 242. Assuming for the present that this is not the case, then steps 250 through 254 are used to monitor whether or not the present iteration is one for which an incremental alteration of offset displacement is permitted as has been discussed with reference to FIGS. 3 and 4.

During the first iteration through the process of FIG. 6a, a preassigned counter (iteration queue counter) or storage location will have a zero value, and process step 250 will decrement the value to below zero. Process step 252 detects a less than zero value, and moves the process on to step 254 which sets a predetermined number back into the counter. As previously discussed, the predetermined number represents the number of iterations corresponding to the period of time during which the change in generalized coordinate values are queued in the buffer store. Assume for purposes of this example that the differential generalized coordinate values are queued for three iterations, and therefore, the number set into the iteration queue counter by process step 254 is three. During the first iteration through this process, the contacts 116 through 122 will be monitored; and if commanded, a modification to the intermediate point will be made. Process step 218 of FIG. 5d will transform the rectangular coordinate values of the modified intermediate point to generalized coordinate values, and process step 220 will compute the change in the generalized coordinates and queue those changes in the buffer store. During the next iteration, the process will move through the steps defined in FIG. 6a; and process step 250 will decrement the iteration queue counter, thereby leaving it with a value of two. Process step 252 will detect that iteration queue counter does not have a value less than zero and move the process to block 280 of FIG. 6d. This process step will be effective to modify the rectangular coordinate values of the intermediate point by the offset values determined during the last iteration, and these modified values will be transformed and stored. This process repeats itself for the next two iterations at which point the queued change in generalized coordinates is output to the robot arm, and the tool centerpoint is actually moved to the modified intermediate point. Further, the differential generalized coordinate values which are currently queued have the same modification associated with them. The detecting means has the opportunity to monitor the effect of its initial command and will change the states of the contacts 116 through 122 accordingly. During the fifth iteration through the process, the decrement iteration queue step 250 will cause the queue counter to achieve a less than zero state, and after process step 252 causes process step 254 to reset the iteration queue counter, a further modification may be executed. Precisely the same method of controlling the intermediate points to be modified is used in applicants' second alternative scheme.

Figure 6B:
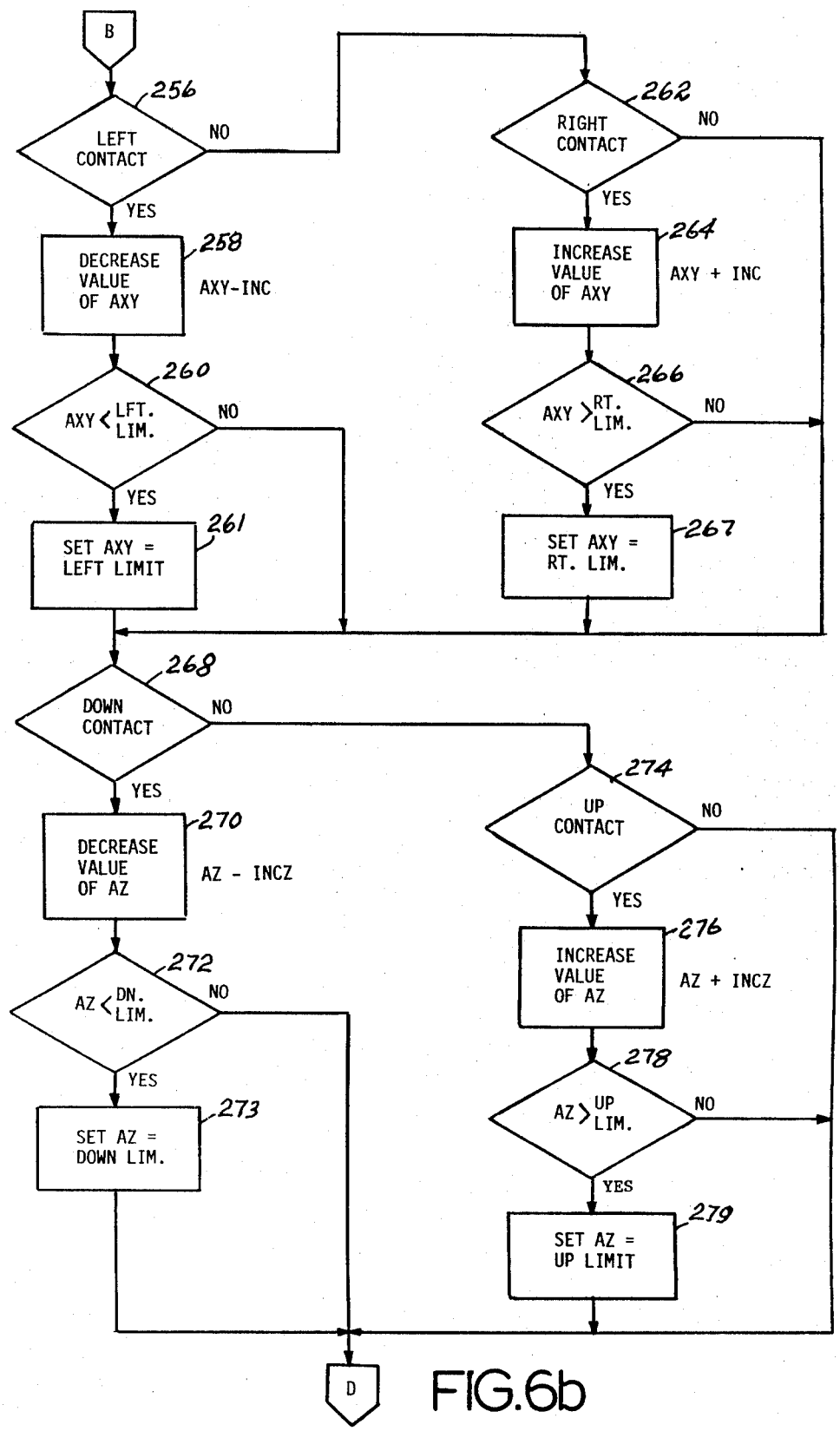
Figure 6C:
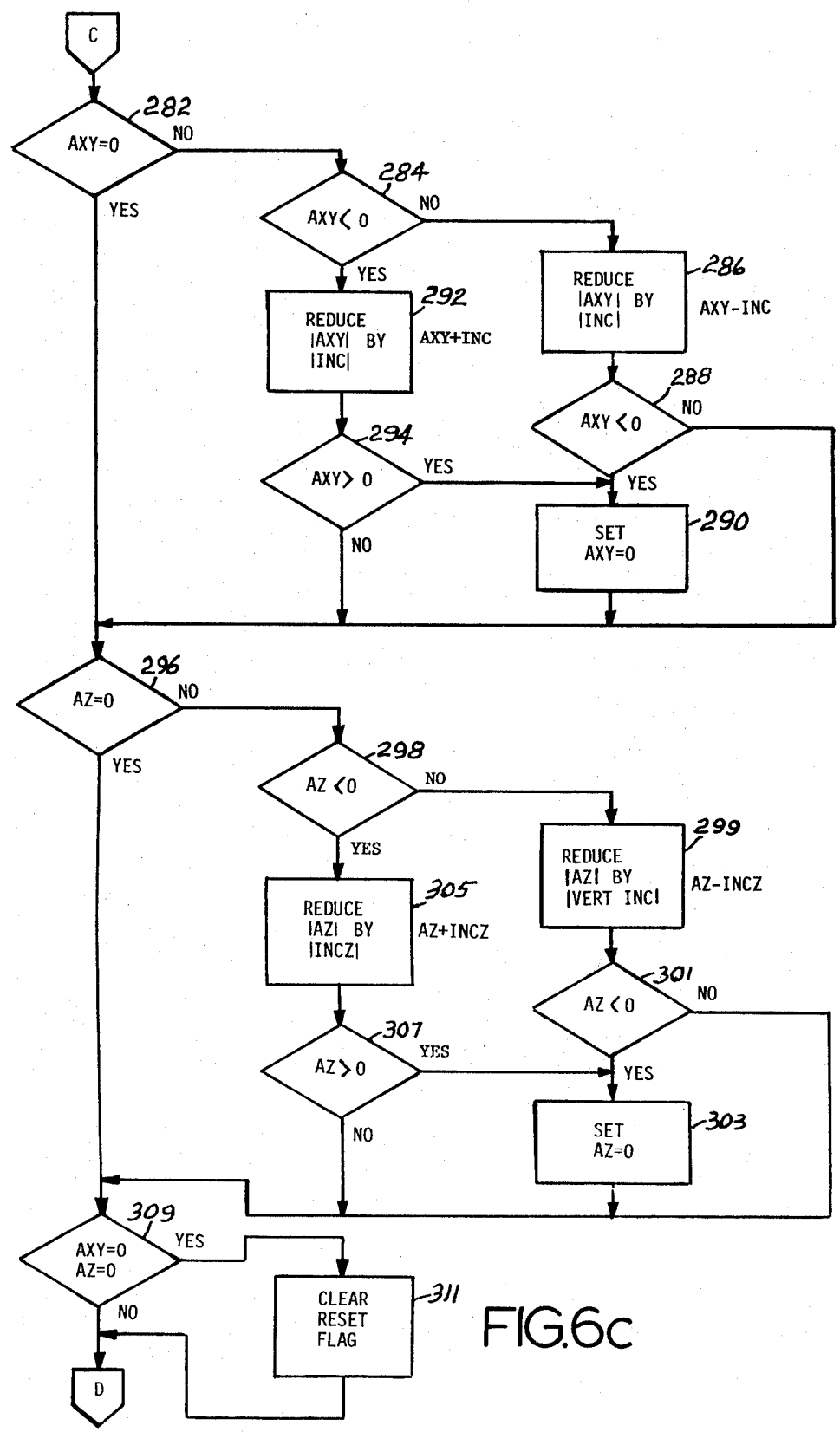

The process then moves to FIG. 6b where process step 256 tests the state of the left contact 120 illustrated in FIG. 2. If the contact 120 is closed, process step 258 sets a new value for the accumulated horizontal offset signal (AXY). The quantity AXY represents the magnitude of the accumulated horizontal offset along a normal to the predetermined path. Applicants' process defines the direction of the offset with respect to the direction of motion along the predetermined path. If the path modification occurs to the left, the offset is defined with a negative sense; and if the modification occurs to the right of the predetermined path, the offset is defined with a positive sense. Since the left contact is closed, process step 258 will define a more negative offset value. Consequently, the new accumulated offset value is determined by subtracting a predefined horizontal incremental magnitude (INC) from the magnitude of the current accumulated offset value. This increment is shown as line 131 in FIG. 3. Process step 260 tests whether the value of the accumulated horizontal offset signal is less than the value of the left limit. The value of the left limit is a negative number which may be arbitrarily set depending on the application. If the value of the accumulated horizontal offset signal is less than the left limit, the process step 261 sets the offset signal value equal to the left limit; and the process continues with the limited path modification. If the value of the accumulated horizontal offset signal is not less than the left limit, the process will permit the intermediate point to be moved a full horizontal increment of displacement along the normal to the left of the predetermined path.

Returning to the process step 256, if the left contact is not closed, process step 262 tests the state of the right contact 122. If the right contact is closed, process step 264 establishes a new magnitude of the accumulated horizontal offset signal by increasing the current value of the accumulated offset signal by the predetermined horizontal increment (INC). The new value of the accumulated horizontal offset signal represents an incremental displacement toward the right of the predetermined path along a normal in a horizontal plane. Next, process step 266 tests if the new accumulated horizontal offset signal value is greater than the value of the right limit. The right limit is a positive number which is established in a similar manner to the left limit. If the accumulated horizontal offset signal has a value greater than the value of the right limit, process step 267 sets the value of the offset signal equal to the right limit, and no greater path modification may occur. If the accumulated horizontal offset signal value is less than the right limit, the new accumulated horizontal offset signal will be effective to modify the position of the intermediate point by the full horizontal increment.

Process step 268 tests to determine if the down contact 118 is closed. If the contact is closed, process step 270 establishes a new value of the accumulated vertical offset signal (AZ) along the vertical axis by subtracting a predetermined vertical increment (INCZ) from the current value of the accumulated vertical offset signal. The vertical increment is shown as line 136 in FIG. 3 as an up displacement. Path modifications along the vertical axis below the predetermined path have a negative sense, and path modifications along the vertical axis above the predetermined path have a positive sense. Process step 272 tests if the accumulated vertical offset signal magnitude is less than the value of the down limit. The down limit is a predetermined negative number; and if the magnitude of the offset signal is less than the down limit, process step 273 sets the accumulated vertical offset signal value equal to the down limit thereby limiting the extent of modification to the path. If the value of the accumulated vertical offset signal is not less than the down limit, the vertical offset signal is effective to modify the position of the intermediate point by the full vertical incremental magnitude.

Process step 274 checks the state of the up contact 116. If the up contact is closed, process step 276 establishes a new value for the accumulated vertical offset signal which equals its present value plus a predetermined vertical incremental magnitude (INCZ). Process step 278 tests the value of the accumulated vertical offset signal against an up limit. If the value of the accumulated vertical offset signal is greater than the up limit, process step 279 sets the offset signal value equal to the up limit thereby limiting the extent of path modification in the up direction. If the value of the accumulated vertical offset signal is not greater than the up limit, the offset signal is effective to modify the position of the intermediate point by the full vertical incremental magnitude.

The process then moves to step 280 which is effective to modify the rectangular coordinate values of the intermediate point defined in step 214 of FIG. 5d. The modification may occur along a normal in a horizontal plane to the left or to the right of the predetermined path. In applicant's preferred embodiment, the horizontal plane is defined by the X and Y coordinate axes of the robot rectangular coordinate system. Therefore, it is necessary to define the position of the offset point along the normal in terms of X and Y coordinate values. Referring back to FIG. 3, and considering the offset point $OP_1$, the coordinate component Y axis must be determined given the increment of displacement 131 normal to the path. First and second axial offset signals representing the rectangular coordinate components may be generated by multiplying the magnitude along the normal ($|AXY|$) by the direction cosines in the X and Y axes respectively. This results from the relationship of the angle $\theta$ of the predetermined path 128 measured with respect to the X axis, and the angle $\alpha$ of the normal 131, measured with respect to the X axis; that is, $\alpha$ equals 90 degrees minus $\theta$. Thus:

$$\text{Cosine } \alpha = \text{sine } \theta = \frac{Y_1 - Y_0}{S_{xy}} = U_8$$

$$\text{Sine } \alpha = \text{cosine } \theta = \frac{X_1 - X_0}{S_{xy}} = U_7$$

Where $S_{xy} = \sqrt{(X_1 - X_0)^2 + (Y_1 - Y_0)^2}$

Therefore, the X axis component of the normal is equal to the product of direction number $U_8$ and the magnitude of the accumulated horizontal offset (AXY) and the Y axis component is equal to the product of the direction number $U_7$ and the magnitude of the accumulated horizontal offset (AXY). As a result of the sign convention for the accumulated offset, the Y axis component is computed using the negative of direction number $U_7$.

Figure 6D:
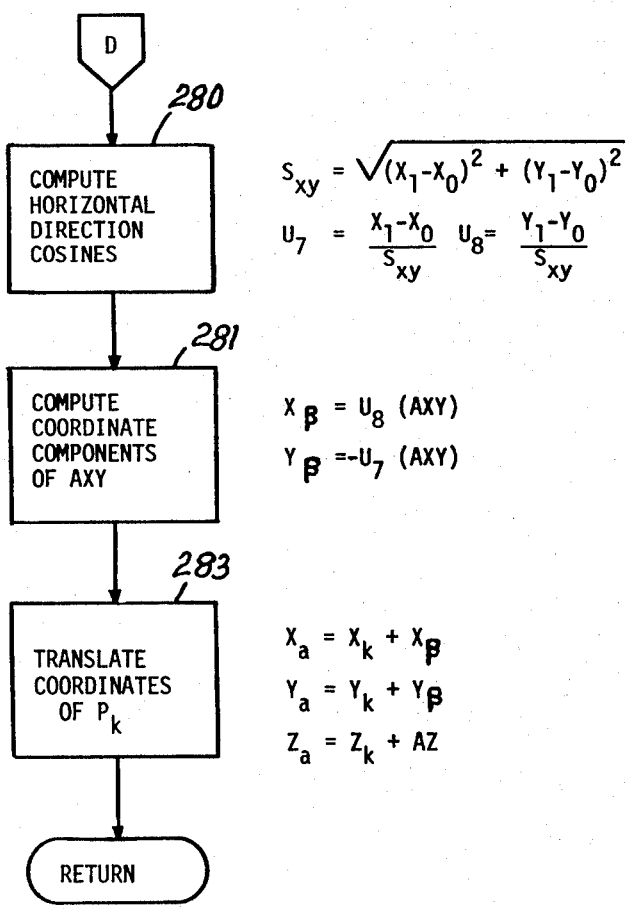

Therefore, referring to the equations associated with process steps 280 through 283 of FIG. 6d, a modified set of intermediate signals ($X_a, Y_a, Z_a$) may be produced by modifying the rectangular coordinate component values of the intermediate point by the offset signals. The coordinate components of the accumulated horizontal offset are calculated by steps 280 and 281 and the coordinates of the modified intermediate point are computed by step 283. A first coordinate component signal (Zhd k) representing the Z coordinate value is algebraically summed with the vertical offset signal (AZ). A second coordinate component signal ($X_k$) representing the X coordinate value is algebraically summed with the first axial offset signal ($X_\beta$) and the third coordinate component signal ($Y_k$) representing the Y coordinate value is algebraically summed with the second axial offset signal ($Y_\beta$).

Referring back to FIG. 5d, after the rectangular coordinate values of the intermediate point have been modified by process step 216, process step 218 transforms these coordinate values into corresponding generalized coordinate values defined by the geometric configuration of the robot arm. Process step 220 computes the incremental change in the generalized coordinate values required to move the tool centerpoint from its current position to the modified intermediate point, and a set of differential generalized coordinate values is queued in a buffer store as previously described. The process returns to step 208 which tests if the constant velocity span is comlete; if not, the process described in steps 208 through 220 continues to an iterative basis.

Although the tool centerpoint may be displaced from the predetermined path during the constant velocity span, in this first alternative process it is required that the tool centerpoint return to the predetermined path to reach the predetermined end point $P_1$ of FIG. 3. Therefore, at the end of the constant velocity span and during the final change-of-velocity span, the process ignores the state of the contacts 116 through 122 and automatically changes the value of the X, Y and Z coordinates by an incremental amount with each iteration to return the tool centerpoint to the predetermined path. As was previously described, the process arbitrarily initiates this return starting five iterations before the end of the constant velocity span. This point of the process is detected by process step 248. As long as the number of the current iteration plus five is less than $K_2$ which equals the sum of $m_1 + m_2$, i.e. the number of iterations in the initial change-of-velocity span and the constant velocity span, the path modification process is active.

However, once the number of the current iteration plus five exceeds the total number of iterations, $K_2$, the process moves to step 242 which sets the reset flag and initiates a return of the tool centerpoint to the predetermined path. Process step 244 determines whether the flag is set. Assuming the flag is set, the process moves to process step 282 of FIG. 6c which tests to determine if the accumulated horizontal offset value along the normal is equal to zero. If the normal value is zero, the tool centerpoint is not displaced in the horizontal plane; and no horizontal return is required. If the value along the normal is not zero, process step 284 determines whether or not the value is less than zero. If the value is not less than zero, an offset to the right of the predetermined path exists; and process step 286 is effective to establish a new offset value qual to the current offset value minus the predetermined horizontal increment (INC). Process step 288 determines whether the new offset magnitude overshoots zero. If it does, process step 290 sets the offset magnitude to zero.

If process step 284 determined that the offset magnitude was less than zero, then an offset along the normal to the left of the predetermined path exists. In this case, process step 292 produces a new offset value equal to the current offset value plus a horizontal increment. Applicants have chosen to use the same increments used to create the offset displacements. Process step 294 determines whether the new offset magnitude overshoots zero; if so, process step 292 sets the offset magnitude to zero. In a similar manner, process steps 296 through 307 test the magnitude of the offset along the vertical axis; and if an offset exists in the negative Z direction, vertical increments are added to the offset. If there is an offset in the positive Z direction, vertical return increments are subtracted from the offset signal. Process step 309 determines if the horizontal and vertical offset signal magnitudes are zero; if they are, process step 311 clears the reset flag. If an offset magnitude still exists, the process moves to step 280 of FIG. 6d and then to steps 281 and 283 which are effective to modify the X, Y and Z coordinates in such a manner that the tool centerpoint moves back toward the predetermined path.

Returning to FIG. 5d, during the last five iterations of the constant velocity span, the process of steps 208 through 220 is effective to initiate a return of the tool centerpoint to the programmed path. At the end of the constant velocity span, the process moves to step 222 which determines whether the second change-of-velocity span is complete. If not, process steps 221 through 225 produce rectangular coordinate values of an intermediate point. If the tool centerpoint is off the predetermined path, process step 226 causes an incremental modification of the coordinate values to continue to bring the tool centerpoint back to the path. Process steps 228 and 230 determine the changes in the generalized coordinate values representing the intermediate point, and these differential coordinate values are buffered. The process of steps 222 through 230 continues until the number of iterations equals $K_3$ which is the sum of $m_1+m_2+m_3$. At this point, the tool centerpoint will be located at the second programmed point, $P_1$, and control of the process is shifted to step 166 of FIG. 5a.

While the process for path modification described above which returns the tool centerpoint to the predetermined path is acceptable in a number of applications, there are other situations which require that the tool centerpoint be left at a position offset from the programmed end point. Referring now to FIG. 7 such a situation shall be described.

Figure 7A:
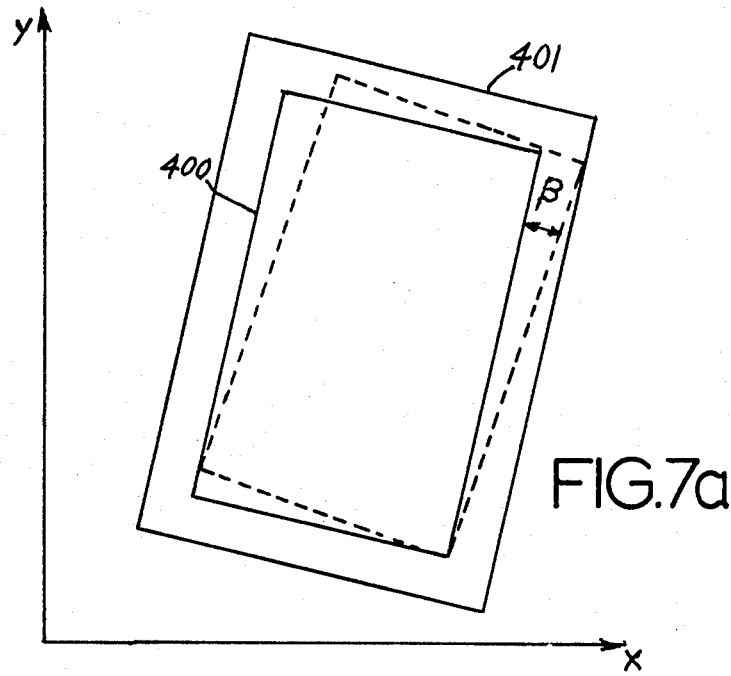
FIGS. 7a and 7b illustrate rotation of a workpiece from the expected position and the corresponding path modifications.

FIG. 7a is a schematic representation of a plate 400 which is to be welded within a recess illustrated by outline 401. The actual orientation of the plate, indicated by the phantom lines, is seen to be rotated through angle $\beta$ from the desired orientation, while the position of one corner is at the expected location. As will be more fully described subsequently, translation of the location of the part may also be accomodated. For purposes of illustration, the magnitude of the rotation through the angle $\beta$ is exaggerated.

The magnitude of $\beta$ is limited as a function of the acceptable difference between actual path velocity and programmed path velocity which results from following a path offset from the predetermined path by a steadily increasing displacement.

Figure 7B:
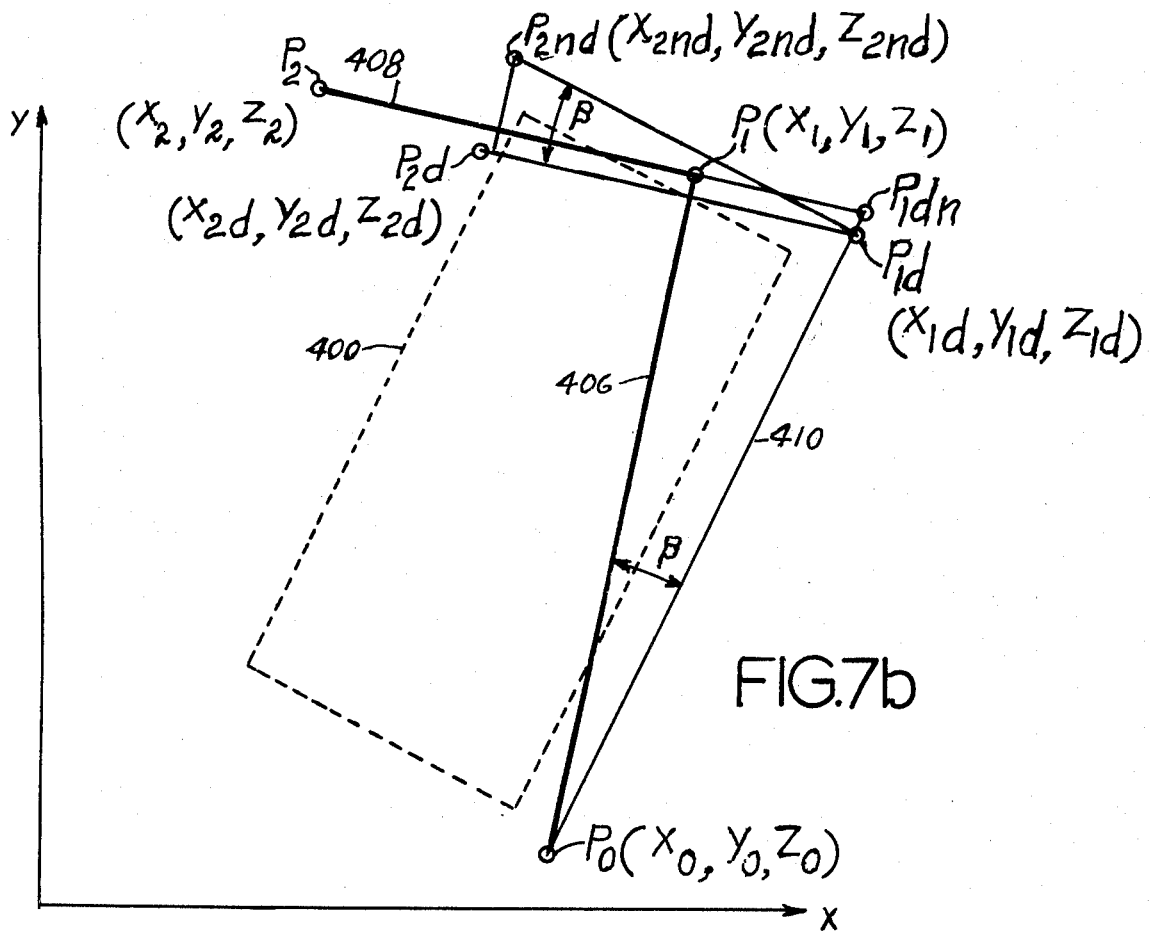

FIG. 7b illustrates the predetermined paths to be followed by the tool centerpoint for welding two sides of the perimeter of plate 400 in cavity 401. The paths are defined by programmed points $P_o$, $P_1$ and $P_2$ and include the solid lines 406 and 408. The phantom line in FIG. 7b illustrates the actual position of plate 400. It will be appreciated that if the first alternative process for path modification above-described were employed in this situation, the tool centerpoint would pass across plate 400 when return to the programmed point $P_1$. Therefore, it is necessary to move the tool centerpoint to an offset position, $P_{1d}$, corresponding to programmed position $P_1$. Thereafter, further path modifications must be effected, else the tool centerpoint would be driven from point $P_{1d}$ to point $P_2$. If the tool centerpoint were to follow a path parallel to path 408 and travel the programmed distance from point $P_1$ to point $P_2$, a path would result ending at point $P_{2d}$. It is seen that the desired end point for this second predetermined path is point $P_{2nd}$.

Considering path 406, if the offset modification along a normal as described in the first alternative process were used to provide an offset point relative to point $P_1$, the tool centerpoint would stop at point $P_{1dn}$ residing at an offset position along a normal from point $P_1$. This, however, results in the path length, $P_oP_{1dn}$ being longer than the predetermined path, $P_oP_1$. It is therefore necessary to find the coordinates of the point $P_{1d}$ prior to reaching the iteration for programmed end point $P_1$.

Figure 8:
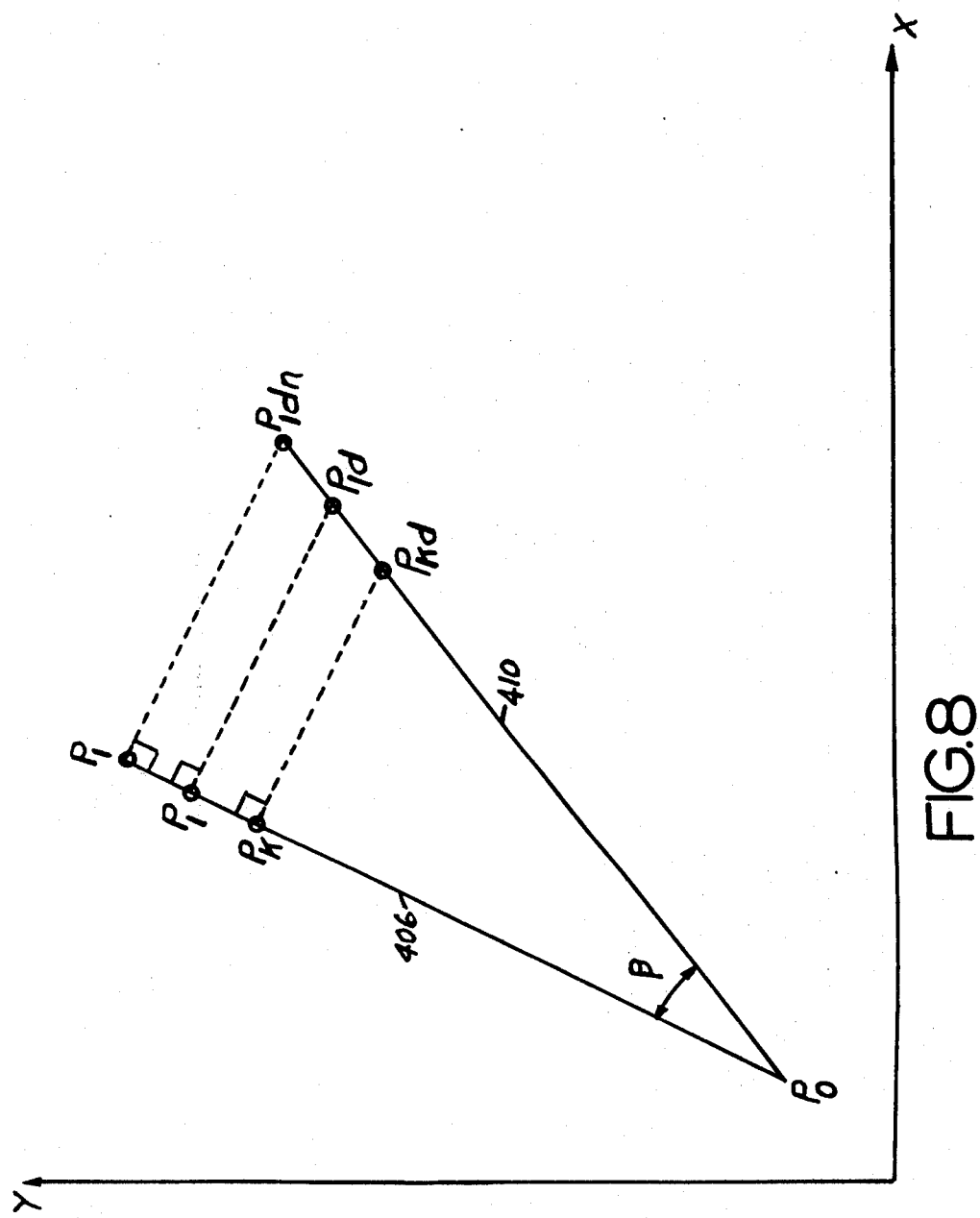
FIG. 8 illustrates the geometric relationships of points along the programmed predetermined path and the modified predetermined path of the second alternative solution.

In order to explain geometrically the process for establishing the point at which the offset point location will correspond to point $P_{1d}$ of FIG. 7b, reference is now made to FIG. 8. In FIG. 8 the programmed points, $P_o$ and $P_1$, are shown as lying within the X,Y plane. Point $P_{1dn}$ is the intersection of the normal from point $P_1$ with the offset path 410. Point $P_{1d}$ is the desired stopping point along path $P_oP_{1dn}$. The distance from point $P_o$ to point $P_{1d}$ is the same as the distance from $P_o$ to $P_1$. It will be appreciated that the predetermined path, 406 from $P_o$ to $P_1$, is rotated through the angle $\beta$ to produce the offset or modified path 410 from $P_o$ to $P_{1d}$. The point $P_{p1}$ is the intermediate point along the predetermined path 406 from which the normal intersects offset path 410 at the desired stopping point, $P_{1d}$. Point $P_k$ represents an intermediate point along the predetermined path 410 and point $P_{kd}$ represents the intersection between the normal to path 406 at point $P_k$ and the offset path 410.

Because applicants' process for executing motion between the present point and the next point requires that the span length be broken into a computed number of iterations of incremental motion along the predetermined path, it is desired to determine the number of iterations represented by the distance from $P_{p1}$ to $P_1$, i.e., the amount by which the predetermined path is to be reduced. Knowing this value, it will then be possible to determine the iteration value (K) corresponding to the point $P_{p1}$. Referring again to FIG. 8, it can be seen that in order to determine the number of iterations required to execute the span from $P_{p1}$ to $P_1$, it is necessary to determine the length from $P_{p1}$ to $P_1$. The mathematical equations for computing this distance ($S_L$) are as follows:

$$P_oP_1 = P_oP_{1d} = S$$
$$P_{p1}P_1 = P_oP_1 - P_oP_{p1}$$
$$= P_oP_1 - P_oP_{1d}(\text{cosine } \beta)$$
$$= S - S(\text{cosine } \beta)$$
$$= S(1 - \text{cosine } \beta)$$

$$(\text{cosine } \beta) = \frac{P_oP_1}{P_oP_{1dn}} = \frac{P_oP_k}{P_oP_{kd}} = R$$

$$S_L = P_{p1}P_1 = S(1 - R)$$

Where $P_oP_{kd}$ is a straight line

Recalling that incremental modification of intermediate point coordinates is not permitted for all intermediate points, it will be appreciated that the actual offset points will not precisely describe a straight line; and the calculated length along the offset path 410 will be affected both by these permitted stepwise modifications and by incremental alterations of the value of the accumulated horizontal offset. To minimize the errors in the calculated value of R that would otherwise be introduced by these variations, applicants use an average value $Q_r$ reflecting the ratio of the distances along the predetermined path and the offset path rather than a single value of R. This average is calculated by accumulating the values of the path length ratios R of intermediate points and their associated offset point and dividing by the number of values accumulated. The ratio R is calculated with each iteration, the average is calculated only once. The equations for this calculation are as follows:

Accumulated ratio $AR = AR + R$

Average ratio $Q_r = AR/(KT+1)$

Where $KT$ = an arbitrary iteration value between $K_1$ and $K_3$ for which the average is calculated And substituting $$S_L = S(1 - Q_r)$$

where $P_oP_{kd}$ approximates a straight line

Once the distance $S_L$ is known, the corresponding number of iterations $M_T$ necessary to advance the tool centerpoint through that distance at the programmed velocity may be calculated from the following:

$$M_T = S_L/V\Delta t$$

Where:
V = programmed velocity
$\Delta t$ = iteration time
$P_{p1}P_1 = S_L$
$M_T$ = number of iterations As will be described subsequently the value of $M_T$ is used to modify the iteration values of the subspans $S_2$ and $S_3$ of the predetermined path.

Referring to FIG. 7b, upon the tool centerpoint reaching point $P_{1d}$, if no additional path modification were desired for motion of the tool centerpoint during execution of the next span corresponding to predetermined path 408, then the path modification feature could be disabled and the tool centerpoint would follow the path between point $P_{1d}$ and point $P_{2d}$ provided that intermediate point coordinate components of path 408 were all modified by the offset values effective to modify intermediate point $P_{p1}$ of path 406. That is, a path parallel to the predetermined path 408 between programmed points $P_1$ and $P_2$ would be followed using the path length $P_1$ to $P_2$ and starting at point $P_{1d}$. To employ the first alternative process for path modification during execution of the span from point $P_{1d}$ to point $P_{2d}$, so that the tool centerpoint can be driven to point $P_{2nd}$ it is necessary to first modify all the intermediate points using as modification values the accumulated offsets active at point $P_{1d}$ and then to further modify the intermediate points using accumulated offset values generated in response to deviation signals.

It will be appreciated that this suggests a two tiered process of continuing path modification in which offset reference values are applied to all points of a predetermined path as a first modification and accumulated offset values are applied at selected points as further modification is required in response to sensed deviations from the path effected by the first modification. It is by such a two tiered process, i.e., applicants' second alternative process, that the paths between points $P_o$, $P_{1d}$ and $P_{2nd}$ of FIG. 7b are to be generated.

Figure 9B:
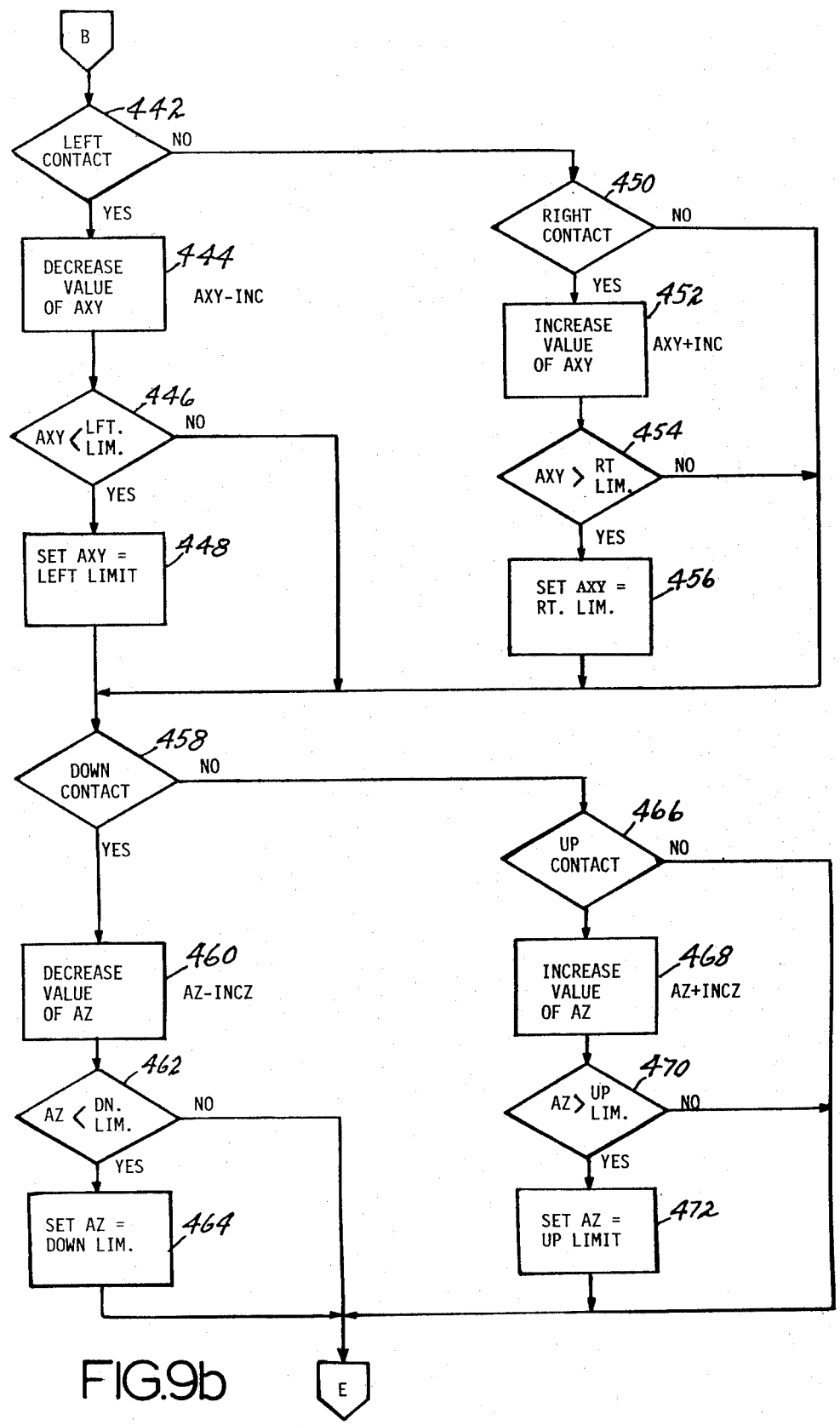
Figure 9C:
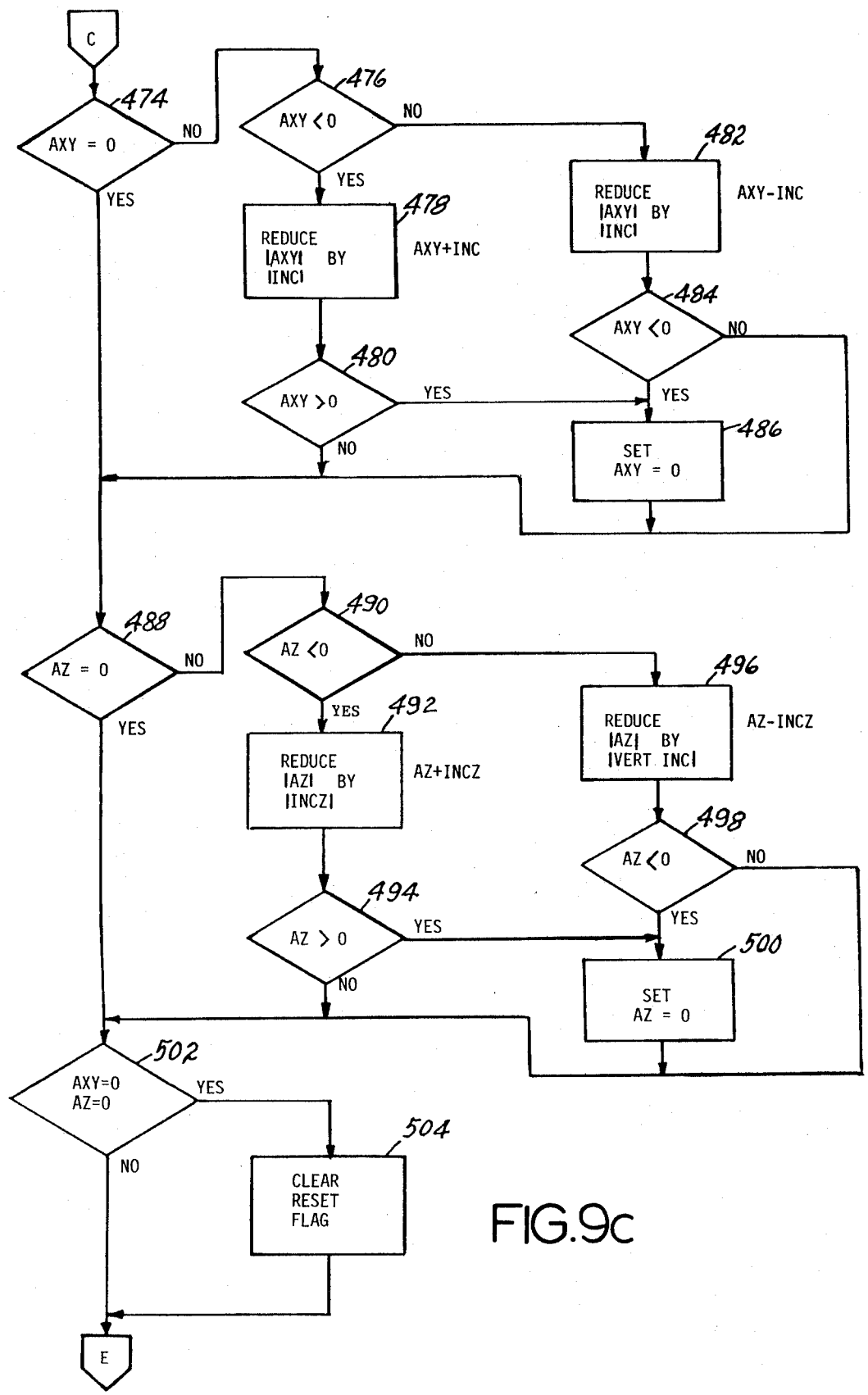
Figure 9D:
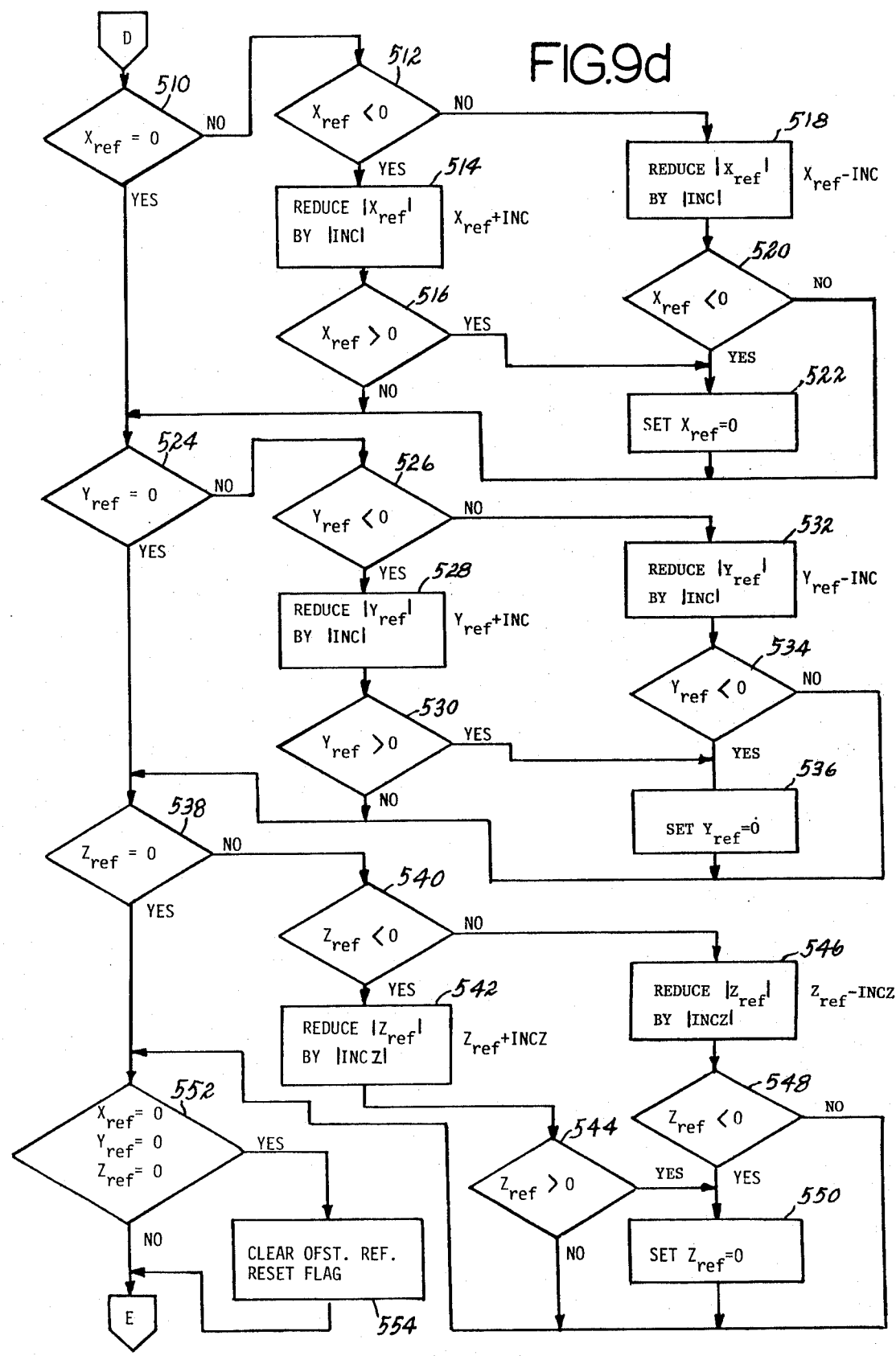
Figure 9E:
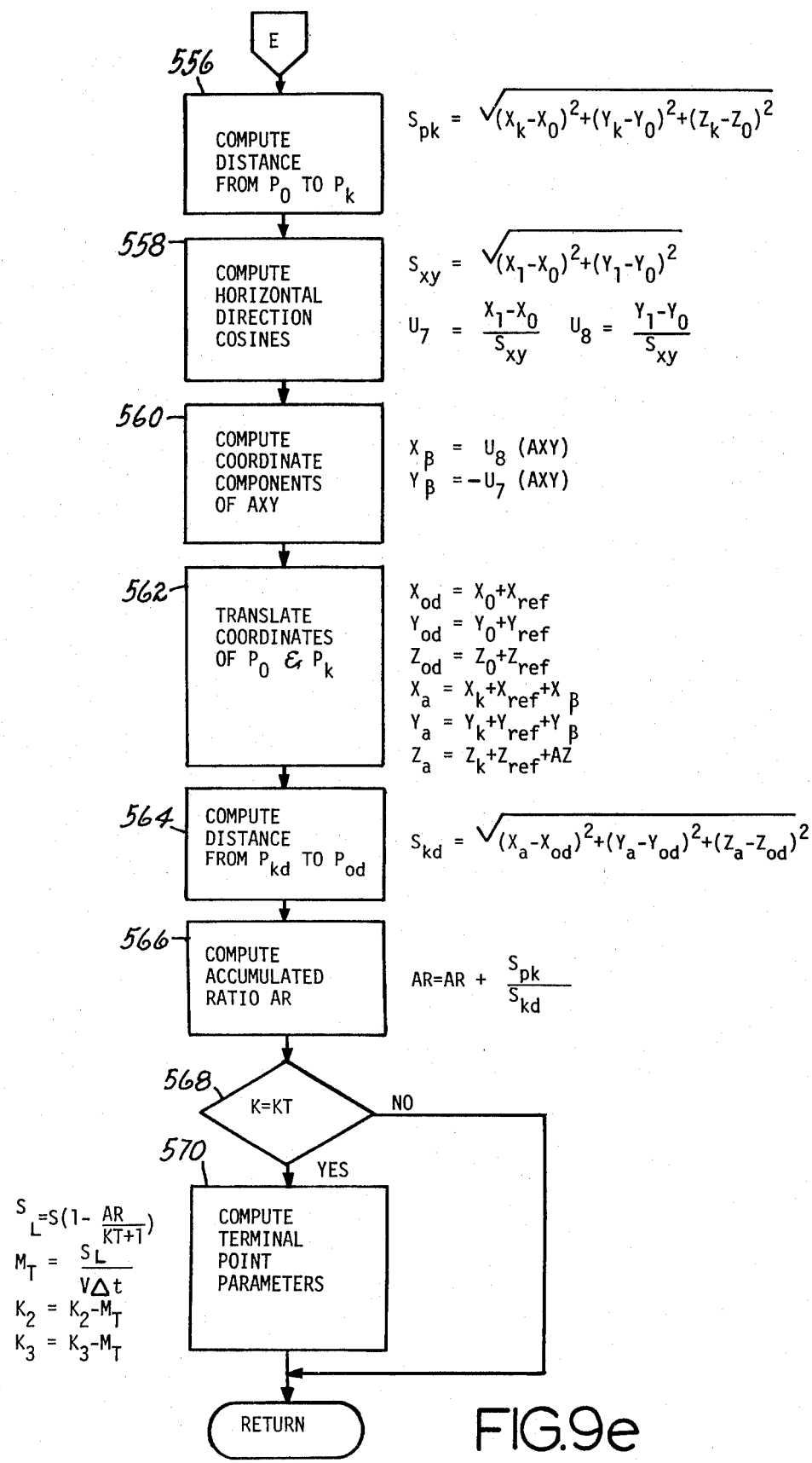

This two tiered process for continuing path modification will be described with reference to the flow charts of FIG. 9. Cursory examination of the flow charts of FIGS. 9b and 9c reveals that these are identical to the flow charts of FIGS. 6b and 6c; therefore, detailed description of the process steps contained therein, that is, steps 442 to 504, inclusive, shall not be given here. The flow chart of FIG. 9d shows the process by which the offset reference values are returned to zero. The flow chart of FIG. 9e gives the process steps for calculating coordinate component values of the offset points.

When the coordinate computation process has proceeded to block 203 of FIG. 5d, the process continues using the process steps of FIG. 9a beginning with decision step 420. Step 420 determines whether or not the present iteration is the first iteration of the present predetermined path. If it is, then the path modification variables are set to their initialization values at step 422. If not, then the process proceeds to decision step 424. As previously discussed the offset reference values are to be used to modify all points of the present predetermined path. Therefore, the initial values of the offset reference signals are equal to the coordinate components of the displacement between the present actual position of the tool centerpoint and the first programmed point. The coordinate of the actual position are of the form $(X_a, Y_a, Z_a)$. The initial values of the accumulated horizontal and vertical offsets for the present predetermined path are zero. The accumulated ratio (AR) which is used in calculating the average length ratio ($Q_r$) previously described, is assigned an initial value of 1. The iteration value (KT) used to compute the average length ratio ($Q_r$) is set equal to 80% of the iterations of the constant velocity subspan.

Decision step 424 determines whether or not the override reference offset is to be reset. This reset is effected by closure of contact 123 of FIG. 2. If it is, the process continues with the flow chart of FIG. 9d which will be described subsequently. If not, then the process proceeds to decision step 425 to determine whether or not the path modification process is enabled for the present predetermined path. The path modification process is enabled by a programmed function. If it is, then the process continues with decision step 426. If it is not, then the process proceeds to the flow chart of FIG. 9e which will be described subsequently. At decision step 426 the state of the reset contact 115 is tested. If reset contact 115 is closed then the reset flag is set by process step 428. If not then the process skips to process step 430 where the state of the reset flag is tested. If the reset flag is set, the process continues with the flow chart of FIG. 9c which as has already been stated is identical to that of FIG. 6c and which will not be further described. If the reset flag has not been set, then the process continues through the iteration queue processing steps 432 through 436. These steps operate in the same manner as steps 250 through 254 of FIG. 6a to control which intermediate points are to be affected by incremental alterations of the accumulated offset values. When the iteration queuing process permits alteration of the accumulated offset values the process proceeds through the flow chart of FIG. 9b which as has already been stated is a duplicate of the flow chart of FIG. 6b. When the iteration queuing process does not permit alteration of the accumulated offset values the process proceeds with the flow chart of FIG. 9e.

Before describing the mechanism of modification of intermediate point coordinates, the process and effect of the flow chart of FIG. 9d shall be described. Reference shall also be made to FIG. 7b and in particular to the offset point $P_{1d}$, the offset path $P_{1d}P_{2d}$ and the predetermined path $P_1P_2$. If all points of predetermined path $P_1P_2$ were modified by the offset values applicable to point $P_1$ to generate the coordinates of point $P_{1d}$ then the path $P_{1d}P_{2d}$ would be followed by the tool centerpoint. Assuming however, that at the start of path $P_{1d}P_{2d}$ the offset reference values are to be reset, then the tool centerpoint would be moved from its actual position $P_{1d}$ to point $P_2$. The flow chart of FIG. 9d is effective to create the changes in the offset reference values necessary to produce that motion. A brief comparison of the flow chart of FIG. 9d with that of FIG. 9c shows that the processes therein are similar. Because it is desired to return the tool centerpoint to the predetermined path between the first and second programmed points the offset reference values must be reduced to zero. This is done in the same incremental fashion as employed in reducing the accumulated offset values to zero. That is, during each iteration, the magnitudes of the offset reference values are reduced by the magnitude of the applicable incremental displacement.

Referring now to FIG. 9d it is seen that decision step 510 determines whether the offset reference value $X_{ref}$ applicable to the X axis coordinate component is non-zero. It it is, then step 512 determines whether it has a negative value. If it does, its magnitude is reduced by that of the incremental displacement by addition at step 514 and if it is positive then this reduction of magnitude is accomplished by subtraction at step 518. The result of either of these steps is tested to determine whether the reduction has changed the sign of the offset reference value and if so then step 522 sets the value equal to zero. In a similar manner, steps 524 through 536 are effective to reduce a nonzero magnitude of the offset reference value of a Y axis coordinate component. Likewise, steps 538 through 550 are effective to reduce a nonzero offset reference value of a Z axis coordinate component. Decision step 552 determines whether or not all the offset reference values are zero and if so, resets the offset reference reset flag tested in decision step 424 of FIG. 9a.

Whether the process has continued through the flow charts of FIG. 9b, 9c, or 9d, the process will ultimately be advanced to the flow chart of FIG. 9e wherein the computations offsetting the predetermined path points and for determining which intermediate point is to be the termination point will be made.

In describing the computation steps of the flow chart of FIG. 9e, reference shall also be made to the geometric representations of FIGS. 7b and 8. Process step 556 computes the distance from the present point $P_o$ to the intermediate point $P_k$ of iteration K along the predetermined path from the programmed point $P_o$ to programmed point $P_1$. Process step 558 computes the direction cosines $U_7$ and $U_8$. Process step 560 computes the coordinate values of the coordinate axis components of the accumulated horizontal offset generated in response to deviation signals during execution of the current path. These values have been arbitrarily designated as $X_\beta$, and $Y_\beta$. The computation follows the same mathematical analysis as that used for computing the coordinate axis components for the accumulated offset values of the first alternative predetermined path override scheme. Process step 562 executes a translation of the intermediate point coordinates to coordinates of the offset point along the path from $P_o$ to $P_{1dn}$. The translated coordinates represent the actual position of the tool centerpoint and have the form $X_a, Y_a, Z_a$. The values of $X_{ref}, Y_{ref}$ and $Z_{ref}$ are those determined during the execution of process step 424 of FIG. 9a or the process of FIG. 9d and represent the values of coordinate components of offsets effective to modify all intermediate points of the current path. Modified coordinate components of the first programmed point $P_o$ are also calculated by step 562 using the reference offset coordinate components to produce the coordinates of the starting point $P_{od}$ of the offset path, which is shown in FIG. 8 as coincident with $P_o$. Point $P_{1d}$ of FIG. 7b is an example of a starting point of an offset path which is displaced from a programmed point. Further, it will now be appreciated that if in FIG. 7a the plate 400 had been translated so that no corner thereof was at the expected location, by assigning appropriate values to the offset reference values effective for the first programmed point $P_o$ the translation of the plate would be taken into account for all subsequent programmed points.

The process then continues to step 564 where the distance along the offset path 410 from $P_{od}$ to the offset intermediate point $P_{kd}$ is calculated. Process step 566 computes the accumulated ratio AR of the distance along the programmed predetermined path to the distance along the offset predetermined path. Decision step 568 tests the value of the iteration number (K) to determine whether or not it is equal to the value of the termination point prediction iteration number KT. If it is not, then the process continues by returning to the appropriate point in the transformation process of FIG. 5d. If, however, the iteration value is equal to the calculated value, then the process continues with computation step 570. Step 570 performs the computations previously discussed with respect to FIG. 8 of (1) determining the length of the span from point $P_{P1}$ to point $P_1$, (i.e. span length differential $S_L$), (2) determining the number of iterations ($M_T$) required to execute that span, and (3) reducing the end-of-span iteration values ($K_2, K_3$) for the constant velocity and deceleration subspans by the calculated number of iterations ($M_T$). Thereafter the process continues by returning to the appropriate point of the flow chart of FIG. 5d.

It will be appreciated that during each iteration through the steps 556 through 566 offset point coordinates and the ratio of lengths necessary for the terminal point prediction calculations are generated. As the tool centerpoint advances along the offset path to point $P_{1d}$, the value of K is updated to reflect which iteration is beng processed. When K is equal to the value of KT the tool centerpoint is approximately 80% through the constant velocity subspan $S_2$. At this point the average value of length ratios will provide a good approximation of the cosine of the angle of rotation so that the required terminal point can be predicted with sufficient accuracy. To proceed from point $P_{1d}$ to point $P_{2nd}$ the offset reference values will be given initial values corresponding to the coordinate components of displacement between $P_1$ and $P_{1d}$. As previously stated these values will produce the path from $P_{1d}$ to $P_{2d}$. To move the tool centerpoint to $P_{2nd}$, the accumulated offset values which would be initialized to zero with the first iteration of this path, must once again be incrementally altered by deviation signals to effect the rotation through angle $\beta$ of path $P_{1d}P_{2d}$.

While the invention has been illustrated in some detail according to the preferred embodiments shown in the accompanying drawings and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for modifying the motion of a tool centerpoint associated with a function element, the motion being along predetermined paths between programmed points and being defined by input signals representing positions and path velocities therebetween relative to a rectangular coordinate system, the apparatus comprising
  (a) a robot arm including means associated with the tool centerpoint for providing a plurality of axes of motion to move the tool centerpoint along predetermined paths, the plurality of axes of motion defining a generalized coordinate system and the arm including a plurality of actuators for effecting motion;
  (b) means for producing a deviation signal during motion between programmed points to command a change in position of the tool centerpoint off the predetermined paths;
  (c) a control including means for storing the input signals and a servomechanism circuit connected to the actuators to move the tool centerpoint along the predetermined paths, the control further including;
    (1) means for recalling first input signals representing first and second program points and a path velocity therebetween
    (2) means for iteratively producing sets of individual control signals representing generalized coordinate values relative to the generalized coordinate system of points along a path offset from the predetermined path, the means for producing sets of individual control signals further including;
      (a) means for producing in response to first input signals, a set of intermediate signals representing intermediate coordinate values relative to the rectangular coordinate axes of an intermediate point located an incremental distance from the first programmed point along the predetermined path,
      (b) means for modifying the set of intermediate signals and the recalled program point signals in response to the deviation signal to produce modified intermediate signals and recalled programmed point signals representing offset points displaced from points along the predetermined path, and
      (c) means for generating in response to the modified sets of intermediate signals and recalled programmed point signals, a set of individual control signals representing generalized coordinate values relative to the generalized coordinate system of an offset point; and
    (3) means for iteratively applying the sets of individual control signals to the servo mechanism circuit to operate the actuators in a coordinated manner to move the tool centerpoint through offset paths displaced from the predetermined paths.

2. The apparatus of claim 1 wherein the means for producing a deviation signal further comprises:
  (a) means for producing horizontal deviation signals representing changes of horizontal position in opposite directions normal to the predetermined path;
  (b) means for producing vertical deviation signals representing changes of vertical position in opposite directions parallel to a vertical axis; and
  (c) means for producing a deviation reset signal representing changes of horizontal and vertical positions to return the tool centerpoint to the predetermined path.

3. The apparatus of claim 2 wherein the means for modifying a set of intermediate signals and the recalled programmed point signals further comprises:
  (a) means for producing a set of offset reference signals representing displacements relative to the rectangular coordinate axes effective to modify all sets of intermediate signals and the recalled programmed point signals of a predetermined path;
  (b) means for producing a set of accumulated offset signals representing displacements relative to the rectangular coordinate axes to modify selected sets of intermediate signals of the predetermined path in response to occurrence of a deviation signal; and
  (c) means for modifying the set of intermediate signals in response to the set of offset reference signals and to the set of accumulated offset signals to produce modified intermediate signals representing a point offset from the intermediate point by the net displacements relative to the rectangular coordinate axes effected by the set of offset reference signals and the set of accumulated offset signals.

4. The apparatus of claim 3 wherein the means for producing a set of offset reference signals further comprises:
  (a) means for producing an intermediate point iteration signal representing a count of the iterations of production of sets of individual control signals; and
  (b) means for producing offset reference coordinate component signals representing the rectangular coordinate axes components of the displacement of the actual position of the tool centerpoint from the first programmed point in response to the intermediate point iteration signal having a value corresponding to the first iteration of the current predetermined path.

5. The apparatus of claim 3 wherein the set of the accumulated offset signals comprises an accumulated vertical offset signal and an accumulated horizontal offset signal and the means for producing a set of accumulated offset signals further comprise:
  (a) means for storing an accumulated vertical offset signal and an accumulated horizontal offset signal representing initial values thereof when the value of the intermediate point iteration signal corresponds to the first iteration of the current predetermined path;
  (b) means for producing a vertical increment signal in response to a vertical deviation signal;
  (c) means for modifying the stored value of the accumulated vertical offset signal by adding a vertical increment signal thereto in response to a first vertical deviation signal and by subtracting a vertical increment signal therefrom in response to a second vertical deviation signal;
  (d) means for producing a horizontal increment signal in response to a horizontal deviation signal; and
  (e) means for modifying the stored value of the accumulated horizontal offset signal by adding a horizontal increment signal thereto in response to a first horizontal deviation signal and by subtracting a horizontal increment signal therefrom in response to a second horizontal deviation signal.

6. The apparatus of claim 5 wherein the means for modifying the set of intermediate signals further comprises:
  (a) means for producing horizontal coordinate components signals representing the horizontal coordinate components of the accumulated horizontal offset signal; and (b) means for algebraically adding the set of intermediate signals respectively to the horizontal coordinate component signals and the accumulated vertical offset signal and to the offset reference signals thereby producing a modifying set of intermediate signals representing the coordinates of an offset point.

7. The apparatus of claim 6 wherein the predetermined path is a straight line and the locus of offset points approximate a line rotated from the predetermined path and the means for producing accumulated offset signals further comprises:

(a) means for producing an intermediate distance signal representing the distance from the intermediate point to the first programmed point;

(b) means for producing an offset path length signal representing the distance from the offset point to a point from which the offset path originated;

(c) means for producing a predetermined path length signal representing the distance between the first and second programmed points;

(d) means for producing terminal point parameter signals in response to the offset path length signal, the intermediate distance signal and the predetermined path length signal, the terminal point parameter signals representing a terminal intermediate point for which the associated offset path length signal is equal to the predetermined path length signal; and (e) means for terminating the production of intermediate signals associated with the predetermined path defined by the last recalled programmed points when the last intermediate point produced corresponds to the terminal intermediate point.

8. An apparatus for modifying the motion of a tool centerpoint associated with a function element, the motion being along a predetermined path between two programmed points and being defined by input signals representing positions and a path velocity therebetween relative to a rectangular coordinate system, the apparatus comprising (a) a robot arm including
  (1) a base,
  (2) an upper arm having one end in mechanical communication with the base and being movable with respect to the base about two perpendicular axes of rotation
  (3) a lower arm having one end associated with the function element and the other end pivotally joined to the other end of the upper arm by a third axis of rotation; and
  (4) a plurality of actuators each indepenently controlling one of the axes of rotation, said axes of rotation and the upper and lower arm defining a generalized coordinate system independent of the rectangular coordinate system; and (b) means for producing a deviation signal during motion between programmed points to command a change in position of the tool centerpoint off the predetermined path;

(c) a control including means for storing the input signals and a servomechanism circuit connected to the actuators to move the tool centerpoint along the predetermined path, the control further including;

(1) means for recalling first input signals representing first and second program points and a path velocity therebetween;

(2) means for iteratively producing sets of individual control signals representing generalized coordinate values relative to the generalized coordinate system of points along the predetermined path, the means for producing sets of individual control signals further including;

(a) means for producing in response to the first input signals, a set of intermediate signals representing coordinate values relative to the rectangular coordinate axes of an intermediate point located an incremental displacement from the first programmed point along the predetermined path, (b) means for modifying the set of intermediate signals in response to the deviation signal to produce a modified set of intermediate signals representing an offset point displaced from the intermediate point, and (c) means for generating in response to the modified set of intermediate signals a set of individual control signals representing generalized coordinate values relative to the generalized coordinate system of the offset point; and (3) means fo iteratively applying the sets of individual control signals to the servo mechanism circuit to operate the actuators in a coordinate manner to move the tool centerpoint through the offset points between the first and second programmed points.

9. The apparatus of claim 8 wherein the means for producing a deviation signal further comprises:

(a) means for producing horizontal deviation signals representing changes of horizontal position in opposite directions normal to the predetermined path;

(b) means for producing vertical deviation signals representing changes of vertical position in opposite directions parallel to a vertical axis; and (c) means for producing a deviation reset signal representing changes of horizontal and vertical positions to return the tool centerpoint to the predetermined path.

10. The apparatus of claim 9 wherein the deviation signal commands a change in the position of the tool centerpoint parallel to a vertical axis and the means for modifying a set of intermediate signals further comprises:

(a) means for producing an accumulated vertical offset signal representing a vertical displacement from the intermediate point parallel to the vertical axis; and (b) means for modifying the set of intermediate signals in response to the vertical offset signal to produce modified intermediate signals representing teh coordinate values relatived to the rectangular coordinate system of a point offset from the intermediate point of vertical displacement.

11. The apparatus of claim 10 wherein the means for producing the accumulated vertical offset signal further comprises:

(a) means for storing an accumulated vertical offset signal representing an initial value of zero;

(b) means for producing a vertical increment signal in response to a vertical deviation signal;

(c) means for modifying the stored accumulated vertical offset signal by adding thereto a vertical increment signal representing a predetermined vertical increment of displacement in response to a deviation signal commanding a change in position in a first vertical direction; and (d) means for modifying the stored accumulated vertical offset signal by subtracting therefrom the vertical increment signal in response to a deviation signal commanding a change in position in a second vertical direction.

12. The apparatus of claim 11 wherein the means for modifying the set of intermediate signals further comprises means for algebraically summing the accumulated vertical offset signal with a vertical axis component signal representing the intermediate point coordinate with respect to the vertical axis.

13. The apparatus of claim 9 wherein the deviation signal commands a change in position to a point along a normal to the predetermined path, the normal ying within a horizontal plane, and wherein the means for modifying the intermediate signals further comprises:

(a) means for producing an accumulated horizontal offset signal representing a horizontal displacement along the normal in the horizontal plane; and (b) means for modifying the set of intermediate signals to represent the coordinate values with respect to the rectangular coordinate system of a point offset from the intermediate point the horizontal displacement.

14. The apparatus of claim 13 wherein the means for producing the accumulated horizontal offset signal further comprises:

(a) means for storing an accumulated horizontal offset signal representing an initial value of zero;

(b) means for producing a horizontal increment signal in response to a horizontal deviation signal;

(c) means for modifying the stored accumulated horizontal offset signal by adding thereto a horizontal increment signal representing a horizontal increment of displacement along a horizontal normal to the predetermined path in response to the deviation signal commanding a change in position in a first horizontal direction; and (d) means for modifying the stored accumulated horizontal offset signal by subtracting therefrom the horizontal increment signal in response to the deviation signal commanding a change in position in a second horizontal direction.

15. The apparatus of claim 14 wherein the means for modifying the set of intermediate signals further comprises:

(a) means for producing horizontal offset coordinate component signals representing the horizontal coordinate axis components of the accumulated horizontal offset; and (b) means for algebraically adding the set of intermediate signals respectively to the horizontal coordinate component signals thereby producing a modified set of intermediate signals representing the coordinates of the offset point.

16. The apparatus of claim 15 wherein the means for applying sets of individual control signals includes means for storing a predefined number of sets of individual control signals for application to the servo mechanism and the control further comprises:

(a) means for counting iterations of the production of sets of individual control signals following the modification of a set of intermediate signals; and (b) means responsive to the iteration counting means for inhibiting the production of horizontal increment signals and vertical increment signals during iterations that the set of individual control signals representing the modified intermediate signals is queued in the control signal storing means before application to the servomechanism circuit.

17. An apparatus for modifying the motion of a tool centerpoint associated with a function element, the motion being along predetermined paths between programmed points and being defined by input signals representing positions and path velocities therebetween relative to a rectangular coordinate system, the apparatus comprising:

(a) a robot arm including
  (1) a base,
  (2) an upper arm having one end in mechanical communication with the base and being movable with respect to the base about two perpendicular axes of rotation,
  (3) a lower arm having one end associated with the function element and the other end pivotally joined to the other end of the upper arm by a third axis of rotation, and
  (4) a plurality of actuators each independently controlling one of the axes of rotation, said axes of rotation and the upper and lower arm defining a generalized coordinate system independent of the rectangular coordinate system; and (b) means for producing a deviation signal during motion between programmed points to command a change in position of the tool centerpoint off the predetermined paths, (c) a control including means for storing the input signals and a servo mechanism circuit connected to the actuators to move the tool centerpoint along the predetermined paths, the control further including;
  (1) means for recalling first input signals representing first and second program points and a path velocity therebetween,
  (2) means for iteratively producing sets of individual control signals representing generalized coordinate values relative to the generalized coordinate system of points along a path offset from the predetermined path, the means for producing sets of individual control signals further including;
    (a) means for producing in response to first input signals, a set of intermediate signals representing intermediate coordinate values relative to the rectangular coordinate axes of an intermediate point located an incremental distance from the first programmed point along the predetermined path;
    (b) means for modifying the set of intermediate signals and the recalled programmed point signals in response to the deviation signal to produce modified intermediate signals and recalled programmed point signals representing offset points displaced from points along the predetermined path, and
    (c) means for generating in response to the modified sets of intermediate signals and recalled programmed point signals, sets of individual control signals representing generalized coordinate values relative to the generalized coordinate system of offset points; and
  (3) means for iteratively applying the sets of individual control signals to the servo mechanism circuit to operate the actuators in a coordinated manner to move the tool centerpoint through offset paths displaced from the predetermined paths.

18. The apparatus of claim 17 wherein the means for producing a deviation signal further comprises:
(a) means for producing horizontal deviation signals representing changes of horizontal position in opposite directions normal to the predetermined path;
(b) means for producing vertical deviation signals representing changes of vertical position in opposite directions parallel to a vertical axis; and
(c) means for producing a deviation reset signal representing changes of horizontal and vertical positions to return the tool centerpoint to the predetermined path.

19. The apparatus of claim 18 wherein the means for modifying a set of intermediate signals and the recalled programmed point signals further comprises:
(a) means for producing a set of offset reference signals representing displacements relative to the rectangular coordinate axes effective to modify all sets of intermediate signals and the recalled programmed point signals of a predetermined path;
(b) means for producing a set of accumulated offset signals representing displacements relative to the rectangular coordinate axes to modify selected sets of intermediate signals of the predetermined path in response to occurence of a deviation signal; and
(c) means for modifying the set of intermediate signals in response to the set of offset reference signals and to the set of accumulated offset signals to produce modified intermediate signals representing a point offset from the intermediate point by the net displacements relative to the rectangular coordinate axes effected by the set of offset reference signals and the set of accumulated offset signals.

20. The apparatus of claim 19 wherein the means for producing a set of offset reference signals further comprises:
(a) means for producing an intermediate point iteration signal representing a count of the iterations of production of intermediate signals; and
(b) means for producing offset reference coordinate component signals representing the rectanguar coordinate axes components of the displacement of the actual position of the tool centerpoint from the first programmed point in response to the intermediate point iteration signal having a value corresponding to the first iteration of the current predetermined path.

21. The apparatus of claim 20 wherein the set of accumulated offset signals comprises an accumulated vertical offset signal and an accumulated horizontal offset signal and the means for producing a set of accumulated offset signals further comprises:
(a) means for storing an accumulated vertical offset signal and an accumulated horizontal offset signal representing initial values thereof when the value of the intermediate point iteration signal corresponds to the first iteration of the current predetermined path;
(b) means for producing a vertical increment signal in response to a vertical deviation signal;
(c) means for modifying the stored value of the accumulated vertical offset signal by adding a vertical increment signal thereto in response to a first vertical deviation signal and by subtracting a vertical increment signal therefrom in response to a second vertical deviation signal;
(d) means for producing a horizontal increment signal in response to a horizontal deviation signal; and
(e) means for modifying the stored value of the accumulated horizontal offset signal by adding a horizontal increment signal thereto in response to a first horizontal deviation signal and by subtracting a horizontal increment signal therefrom in response to a second horizontal deviation signal.

22. The apparatus of claim 21 wherein the means for modifying the set of intermediate signals further comprises:
(a) means for producing horizontal coordinate component signals representing the horizontal coordinate components of the accumulated horizontal offset signal; and
(b) means for algebraically adding the set of intermediate signals respectively to the horizontal coordinate component signals and the accumulated vertical offset signal and to the offset reference signals thereby producing a modified set of intermediate signals representing the coordinates of an offset point.

23. The apparatus of claim 22 wherein the predetermined path is a straight line and the locus of offset points approximate a line rotated from the predetermined path and the means for producing accumulated offset signals further comprises:
(a) means for producing an intermediate distance signal representing the distance from the intermediate point to the first programmed point;
(b) means for producing an offset path length signal representing the distance from the offset point to a point from which the offset path originated;
(c) means for producing a predetermined path length signal representing the distance between the first and second programmed points;
(d) means for producing terminal point parameter signals in response to the offset path length signal, the intermediate distance signal and the predetermined path length signal, the terminal point parameter signals representing a terminal intermediate point for which the associated offset path length signal is equal to the predetermined path length signal; and
(e) means for terminating the production of intermediate signals associated with the predetermined path defined by the last recalled programmed points when the last intermediate point produced corresponds to the terminal intermediate point.

* * * * *

UNITED STATES PATENT AND TRADEMARK OFFICE
CERTIFICATE OF CORRECTION

PATENT NO. : 4,403,281
DATED : September 6, 1983
INVENTOR(S) : John G. Holmes et al It is certified that error appears in the above-identified patent and that said Letters Patent are hereby corrected as shown below:

Figure 5a, the expression $s_t^2 = \sqrt{(x_2 - x_0)^2 + (y_2 - y_0)^2 + (z_2 - z_0)^2}$ should have appeared -- $s_t^2 = (x_2 - x_0)^2 + (x_2 - y_0)^2 + (z_2 - z_0)^2$ --.

Figure 8, the occurrence of $P_1$ nearest $P_K$ on line $P_0 P_K$ should have been -- $P_{p1}$ --.

Column 6, line 18, "Fig. 3 and $P_{k+cq}$" should read -- Fig. 3 as $P_{k+cq}$ --.

Column 6, line 20, following "$OP_p$." the word "by" should be -- By --.

Column 26, line 26, "fo iteratively" should read -- for iteratively --.

Column 27, line 17, "ying" should read -- lying --.

Signed and Sealed this

Third Day of January 1984

[SEAL]

Attest:

GERALD J. MOSSINGHOFF

Attesting Officer

Commissioner of Patents and Trademarks